United States Patent
Ying et al.

(10) Patent No.: US 11,476,773 B2
(45) Date of Patent: Oct. 18, 2022

(54) CONTROL METHOD AND CONTROL SYSTEM FOR MODULAR MULTILEVEL CONVERTER AND POWER TRANSMISSION SYSTEM

(71) Applicant: Delta Electronics (Shanghai) Co., Ltd., Shanghai (CN)

(72) Inventors: Jianping Ying, Shanghai (CN); Yi Zhang, Shanghai (CN); Zhao Wang, Shanghai (CN); Erdong Chen, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/334,788

(22) Filed: May 30, 2021

(65) Prior Publication Data

US 2021/0376758 A1    Dec. 2, 2021

(30) Foreign Application Priority Data

Jun. 1, 2020 (CN) .......................... 202010484768.6

(51) Int. Cl.
  *H02M 7/483*    (2007.01)
(52) U.S. Cl.
  CPC ....... *H02M 7/4835* (2021.05); *H02M 7/4833* (2021.05)
(58) Field of Classification Search
  CPC .................. H02M 7/4833; H02M 7/4835
  See application file for complete search history.

(56) References Cited

U.S. PATENT DOCUMENTS

| | | | |
|---|---|---|---|
| 2014/0078796 A1* | 3/2014 | Inoue ............... | H02M 7/2173 363/68 |
| 2015/0207434 A1 | 7/2015 | Wang et al. | |

(Continued)

FOREIGN PATENT DOCUMENTS

| | | |
|---|---|---|
| CN | 102017385 A | 4/2011 |
| CN | 102916592 A | 2/2013 |

(Continued)

OTHER PUBLICATIONS

R. Marquardt et al., "New Concept for High Voltage-Modular Multilevel Converter", PESC 2004 conference, Aachen, Germany, 2004.

*Primary Examiner* — Jue Zhang
(74) *Attorney, Agent, or Firm* — CKC & Partners Co., LLC

(57) ABSTRACT

Disclosed are a control method and control system for a modular multilevel converter and a power transmission system. The control method includes calculating an actual capacitor voltage of the sub-module; calculating a reference capacitor voltage of the sub-module; dividing the plurality of sub-modules into a plurality of modules, reference capacitor voltages of the sub-modules in the same module are the same, and reference capacitor voltages of the sub-modules from different modules are different; sorting in the module to obtain a first voltage sequence; sorting among different modules to obtain a second voltage sequence; and determining the sub-modules to be switched on or switched off according to charging and discharging states of the sub-module, the first voltage sequence and the second voltage sequence, until an actual level of the bridge arm is consistent with a desired level, wherein the desired level changes using a first preset value as a step.

20 Claims, 19 Drawing Sheets

(56) References Cited

U.S. PATENT DOCUMENTS

| | | | | |
|---|---|---|---|---|
| 2016/0072375 A1* | 3/2016 | Zhou | .................... | H02M 7/4833 |
| | | | | 363/21.1 |
| 2017/0047860 A1* | 2/2017 | Fujii | .................... | H02M 7/4833 |
| 2019/0267898 A1* | 8/2019 | Elserougi | .............. | H02M 3/158 |
| 2020/0373851 A1* | 11/2020 | Wang | .................... | H02M 7/483 |
| 2021/0044216 A1* | 2/2021 | Riar | ........................ | B60L 58/21 |
| 2021/0320587 A1* | 10/2021 | Yu | ........................... | H02M 1/38 |

FOREIGN PATENT DOCUMENTS

| | | | |
|---|---|---|---|
| CN | 105897019 A | | 8/2016 |
| CN | 104065290 B | | 1/2017 |
| CN | 110556880 A | | 12/2019 |
| TW | 201911719 A | | 3/2019 |

\* cited by examiner

CONTROL METHOD AND CONTROL SYSTEM FOR MODULAR MULTILEVEL CONVERTER AND POWER TRANSMISSION SYSTEM

CROSS-REFERENCE TO RELATED APPLICATIONS

This non-provisional application claims priority under 35 U.S.C. § 119(a) on Patent Application No. 202010484768.6 filed in P.R. China on Jun. 1, 2020, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

FIELD

The disclosure relates to the technical field of power transmission and distribution, and particularly to a control method and control system for a modular multilevel converter, and a power transmission system.

BACKGROUND

Modular Multilevel Converters (MMCs) are proposed and filed for patent by professor R. Marquardt at the earliest, and have advantages of low requirement for consistency of switching devices, low switching frequency, small switching loss, more equivalent level numbers, low harmonic content, and easily for redundant design, so MMCs become an important converter topology in a flexible DC power transmission system.

The MMC may be formed of three phases of A, B and C phases, each phase comprising a bridge arm circuit, for example, the bridge arm circuit may include an upper bridge arm and/or a lower bridge arm, and each of the bridgearms may be formed of an inductor L and N sub-modules connected in series. Each of the sub-modules may be formed of one or more power conversion circuits connected in series, each of the power conversion circuits may comprise a capacitor C, and a corresponding AC output voltage may be fitted by controlling the sub-modules to be switched on or switched off.

A DC bus voltage $U_{dc}$ of the MMC is supported by serially connected capacitors of mutually independent sub-modules. To ensure the quality of a waveform of the AC output voltage, and reduce interphase circulating current and ensure respective power semiconductor devices to bear the same voltage stress, it is necessary to ensure fluctuation of capacitor voltages of the respective sub-modules to be within a certain range.

In a case that the voltage level is high and the number of required sub-modules is large, the MMC can use mixed sub-modules with different voltage levels, such that it is possible to reduce the number of drive circuits and communication lines, simplify the circuit, reduce costs, and improve system reliability. However, in such circuit, balance of the capacitor voltages between the sub-modules of the same voltage level, and also between the sub-modules of different voltage levels should be ensured.

At present, methods for equalizing the capacitor voltages of the power conversion circuits of the MMC are mainly as follows:

A hardware voltage equalization circuit is adopted, for example, in the Chinese patent document No. CN105897019A. The technical solution is easily implemented when the number of series connected sub-modules in the MMC is few, but in medium or high voltage systems, as the number of series connected sub-modules in the MMC increases, complexity and cost of the system will be necessarily increased.

A voltage equalization control method by software has also been adopted, it provides a voltage equalization controlling strategy with classification of the sub-modules. The method can reduce the number of sorting operation, but only the sub-modules of the same voltage level can realize voltage equalization, and the method is not suitable for mixed sub-modules of different voltage levels.

Another method is a voltage equalization controlling strategy for sub-modules of different voltage levels, but the method requires each sub-module to have corresponding voltage equilization control loop, and in the case of a huge number of sub-modules in the MMC, control method will be extremely complicated.

Therefore, a novel control method and control system for the MMC are required, which can realize the capacitor voltages balance of mixed sub-modules of different voltage levels.

SUMMARY

In one aspect, the disclosure provides a control method for a modular multilevel converter, the modular multilevel converter comprising a bridge arm circuit including at least one bridge arm, each bridge arm comprising a plurality of sub-modules connected in series, each of the sub-modules comprising one or more power conversion circuits connected in series, and each of the power conversion circuits comprising a capacitor, wherein the control method comprises:

detecting an actual voltage of the capacitor of each of the power conversion circuits in each of the sub-modules, and calculating an actual capacitor voltage of each of the sub-modules;

calculating a reference capacitor voltage of each of the sub-modules according to a reference voltage of the capacitor of each of the power conversion circuits in each of the sub-modules;

dividing the plurality of sub-modules in the bridge arm into a plurality of modules according to the reference capacitor voltage, wherein reference capacitor voltages of the respective sub-modules in the same module are the same, and reference capacitor voltages of the sub-modules from different modules are different;

sorting the actual capacitor voltages of the respective sub-modules in the same module to obtain a first voltage sequence;

normalizing the actual capacitor voltage of each of the sub-modules among different modules into a corresponding normalized voltage, sorting the normalized voltages of all sub-modules in the bridge arms among different modules to obtain a second voltage sequence; and determining the sub-modules to be switched on or switched off according to charging and discharging states of each sub-module, the first voltage sequence and the second voltage sequence till an actual level of the bridge arm is consistent with a desired level, wherein the actual level of the bridge arm corresponds to a sum of the actual capacitor voltages of the plurality of sub-modules in a switch-on state within the bridge arm, and the desired level changes with a step of a first preset value.

In another aspect, the disclosure provides a control system for a modular multilevel converter, the modular multilevel converter comprising a bridge arm circuit including at least one bridge arm, each of the bridge arms comprising a plurality of sub-modules connected in series, each of the sub-modules comprising one or more power conversion circuits connected in series, and each of the power conversion circuits comprising a capacitor, wherein the control system comprises:

a detection and grouping unit for detecting an actual voltage of the capacitor of each of the power conversion circuits in each of the sub-modules, and calculating an actual capacitor voltage of each of the sub-modules; while calculating a reference capacitor voltage of each of the sub-modules according to a reference voltage of the capacitor of each of the power conversion circuits in each of the sub-modules; and dividing the plurality of sub-modules in the bridge arm into a plurality of modules according to the reference capacitor voltage, wherein reference capacitor voltages of the respective sub-modules in the same module are the same, and reference capacitor voltages of the sub-modules from different modules are different;

a sorting unit configured for sorting the actual capacitor voltages of the respective sub-modules in the same module to obtain a first voltage sequence; and for normalizing the actual capacitor voltage of each of the sub-modules among different modules into a corresponding normalized voltage, sorting the normalized voltages of all sub-modules in the bridge arms to obtain a second voltage sequence; and a modulation algorithm unit for determining the sub-modules to be switched on or switched off according to charging and discharging states of each sub-module, the first voltage sequence and the second voltage sequence, until an actual level of the bridge arm is consistent with a desired level, wherein the actual level of the bridge arm corresponds to a sum of the actual capacitor voltages of the plurality of sub-modules in a switch-on state within the bridge arm, and the desired level changes with a step of a first preset value.

In another aspect, the disclosure further provides a power transmission system, comprising: a modular multilevel converter comprising a bridge arm circuit including at least one bridge arm, each of the bridge arms comprising a plurality of sub-modules connected in series, each of the sub-modules comprising one or more power conversion circuits connected in series, and each of the power conversion circuits comprising a capacitor; and the control system.

The additional aspects and advantages of the disclosure are partially explained in the below description, and partially becoming apparent from the description, or can be obtained through practice of the disclosure.

BRIEF DESCRIPTION OF THE DRAWINGS

The exemplary embodiments will be described in detail with reference to the accompanying drawings, through which the above and other features and advantages of the disclosure will become more apparent.

DETAILED DESCRIPTION

Figure 1:
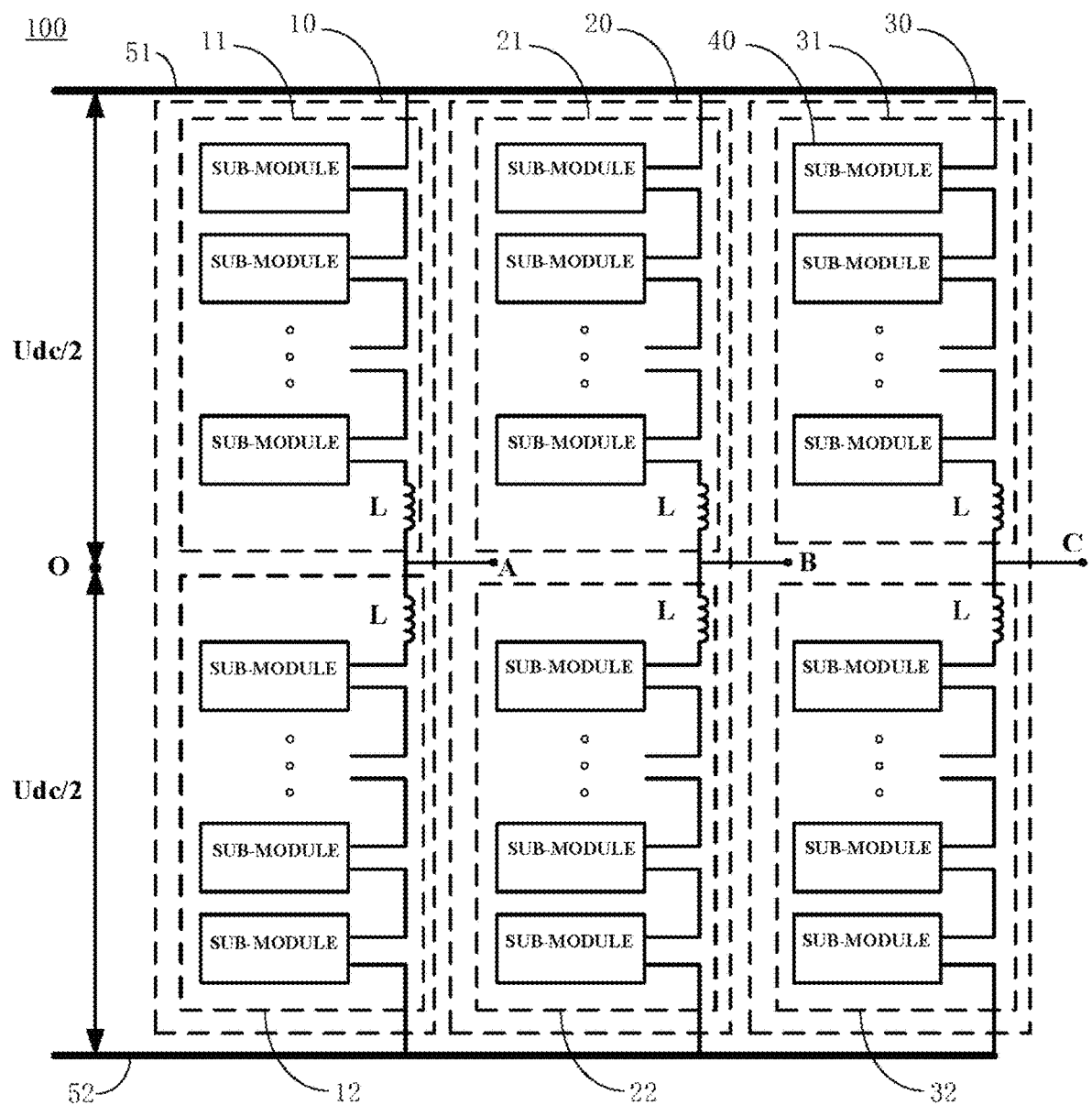
FIG. 1 is a structural diagram of a modular multilevel converter (MMC) according to the disclosure.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this disclosure will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. In addition, the terms "first", "second" and the like in the claims are only used as signs, instead of numeral limitations to objects.

The Modular Multilevel Converter (MMC) of the disclosure includes a bridge arm circuit, the bridge arm circuit includes at least one bridge arm (or leg), and each of the bridge arms includes a plurality of sub-modules connected in series. Each of the sub-modules may include one or more power conversion circuits connected in series, and each of the power conversion circuits may include a capacitor.

As shown in FIG. 1, a preferable Modular Multilevel Converter (MMC) 100 of the disclosure is formed of three phases (A phase, B phase and C phase), for example. Each phase may include a bridge arm circuit, such as, the bridge arm circuits 10, 20 and 30, and each of the bridge arm circuits 10, 20 and 30 may include upper and lower bridge arms. More specifically, the bridge arm circuit 10 includes an upper bridge arm 11 and a lower bridge arm 12, the bridge arm circuit 20 includes an upper bridge arm 21 and a lower bridge arm 22, and the bridge arm circuit 30 includes an upper bridge arm 31 and a lower bridge arm 32. Each of the bridge arms (11, 12, 21, 22, 31 and 32), for example, may be formed of an inductor L and N sub-modules 40 connected in series.

In the disclosure, AC sides of the A, B and C three phases, such as, may be connected to a power grid, while DC sides of the bridge arms circuit, such as, may be connected to the two poles 51 and 52 of DC bus, respectively, wherein $U_{de}$ is a DC bus voltage between the two poles 51 and 52.

It shall be noticed that each bridge arm circuit also can include only one bridge arm, for example, only one upper bridge arm, or only one lower bridge arm.

Figure 2A:
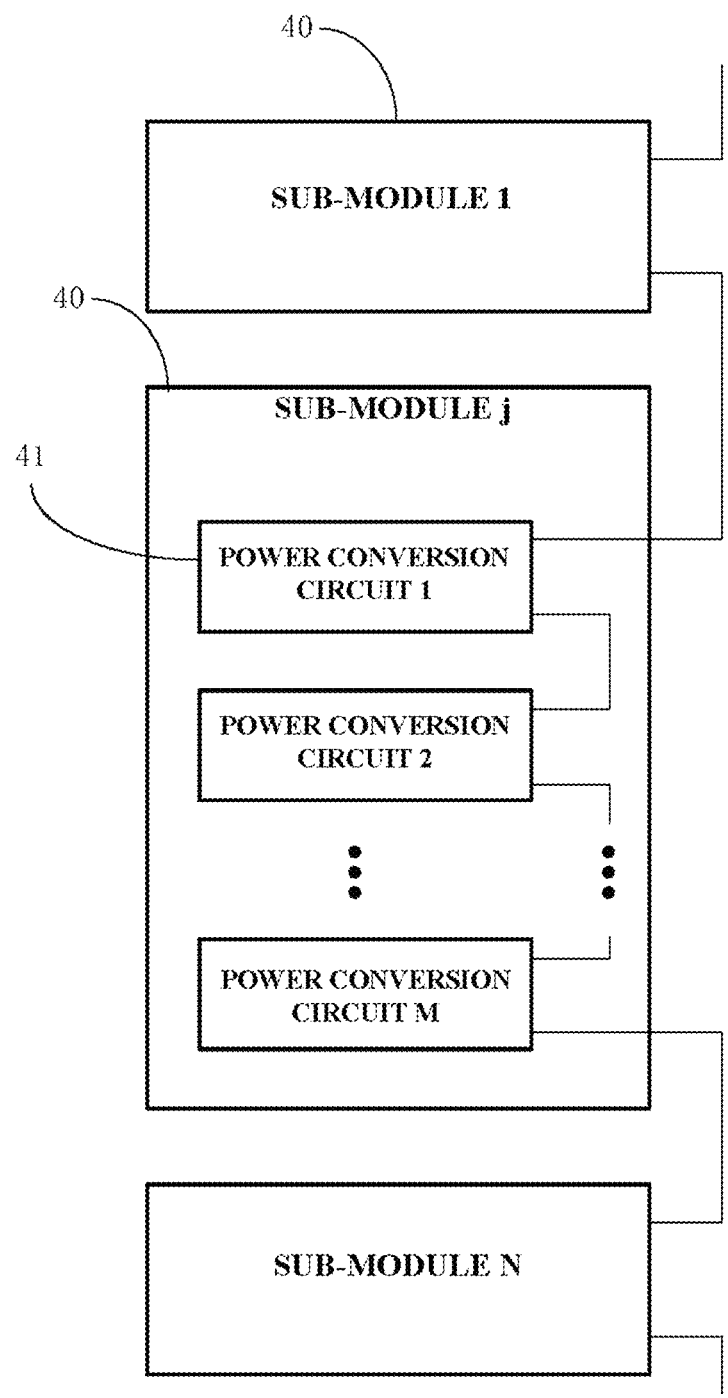
FIG. 2A illustrates a structure of a preferable embodiment of a bridge arm in a bridge arm circuit of FIG. 1, wherein one sub-module of the bridge arm comprises M power conversion circuits.

In the disclosure, as shown in FIG. 2A, each of the sub-modules 40 may include at least M (M≥1) power conversion circuits 41.

Figure 2B:
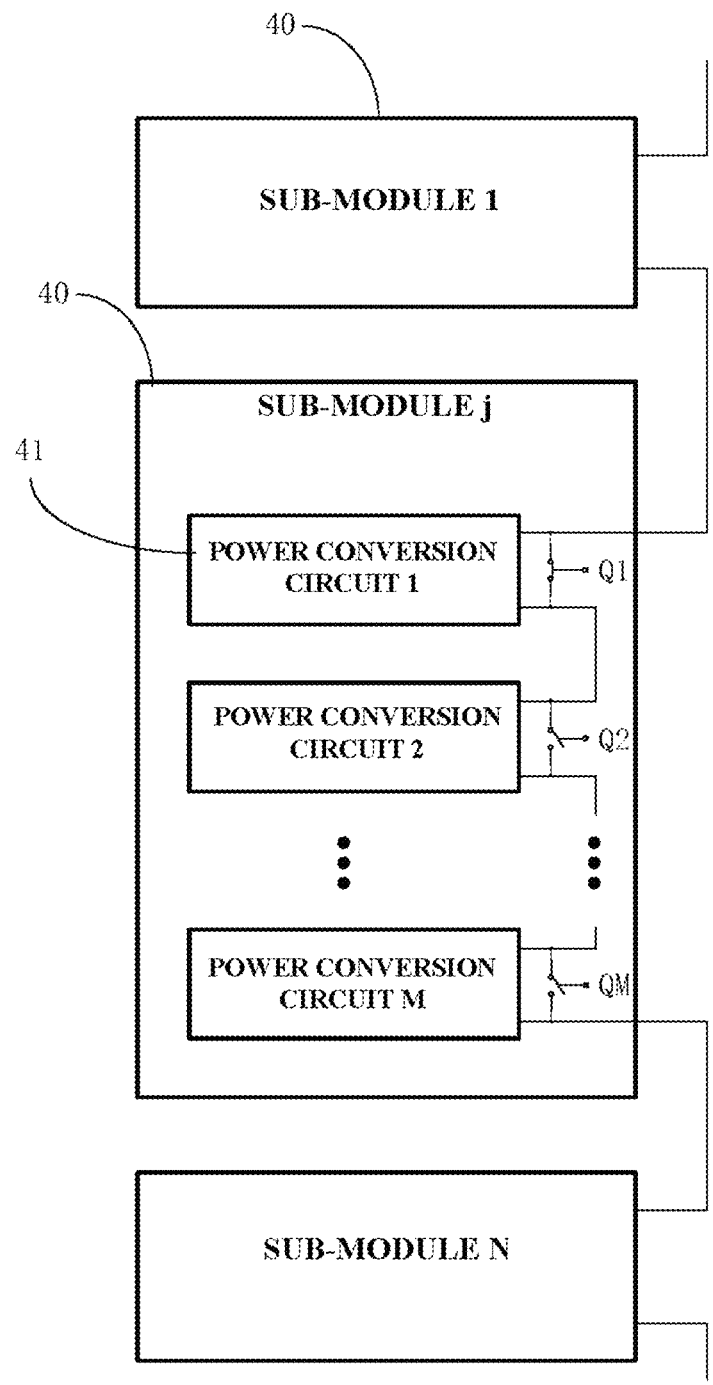
FIG. 2B illustrates a structure of another preferable embodiment of a bridge arm in the bridge arm circuit of FIG. 1, wherein the power conversion circuit of each sub-module has a bypass switch that can realize bypass function.

In the disclosure, as shown in FIG. 2B, the power conversion circuits 41 in each sub-module 40 can be bypassed by parallelly connecting a bypass switch, for example, an output end of each power conversion circuit 41 may be connected in parallel to a switch Q which is normally off. For example, in FIG. 2B, taking the sub-module j for example, output ends of the power conversion circuits 1-M are connected in parallel to switches $Q_1$-$Q_M$. In the disclosure, the switches can be transistors, IGBTs, mechanical switches or other switches controllable by control signals. Moreover, when the switches are switched to "on", the corresponding power conversion circuits are in a bypass mode, and when the switches are switched to "off", the corresponding power conversion circuits are in a connection mode. Further, in the same sub-module, all power conversion circuits 41 in the connection mode use the same driving signal.

Figure 3A:
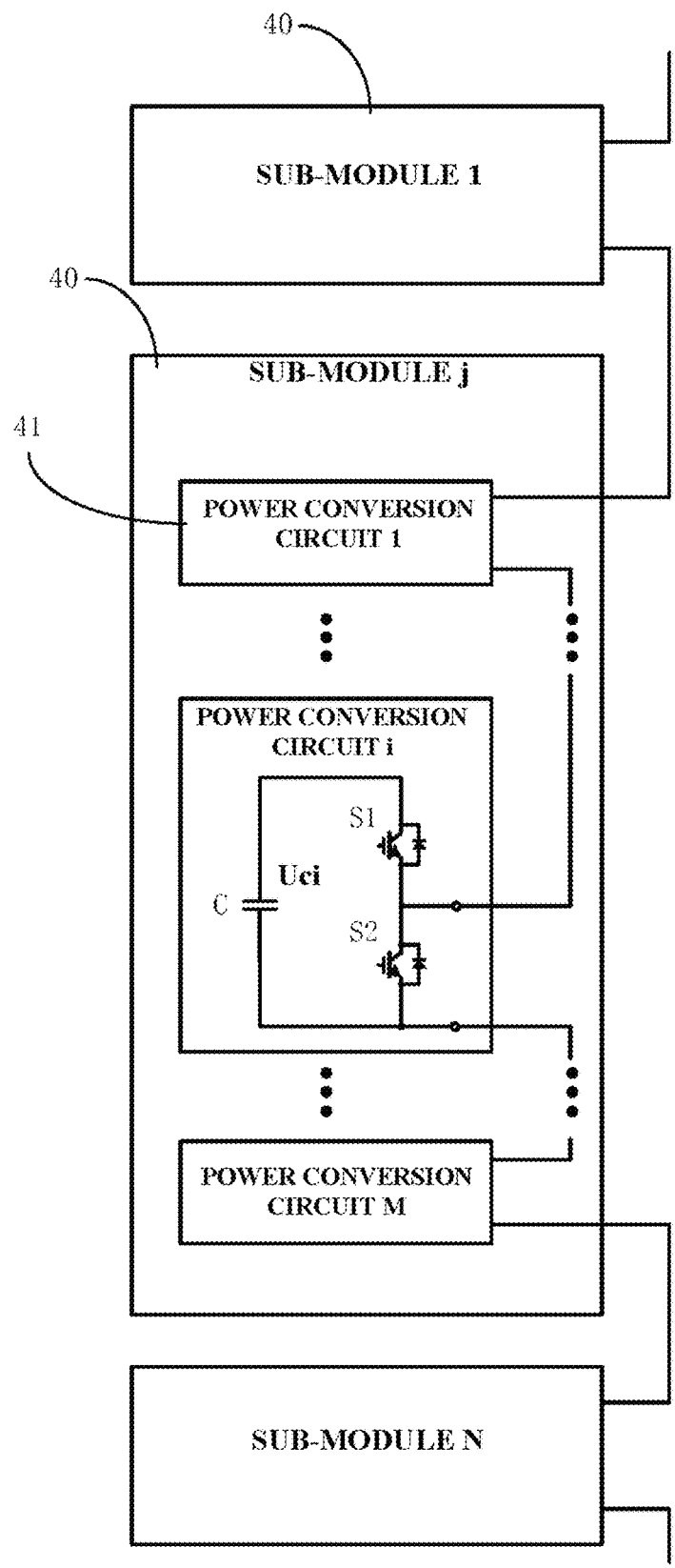
FIG. 3A illustrates a preferable structure of the power conversion circuits according to the disclosure, wherein the power conversion circuits are a half-bridge structure.
Figure 3B:
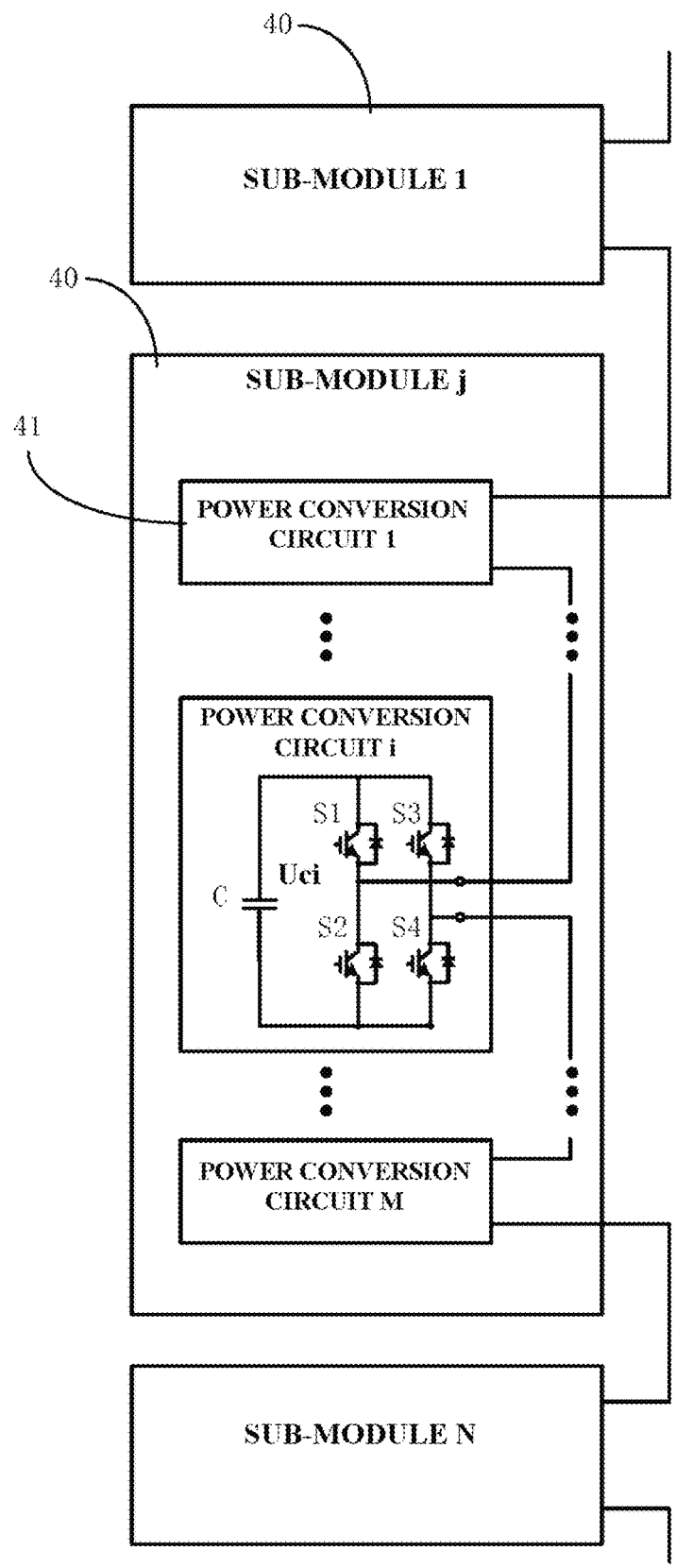
FIG. 3B illustrates another preferable structure of the power conversion circuits according to the disclosure, wherein the power conversion circuits are a full-bridge structure.

In the disclosure, the power conversion circuits 41 can use multiple circuit topologies, for example, a half-bridge structure (shown in FIG. 3A) or a full-bridge structure (shown in FIG. 3B). As shown in FIG. 3A, taking the power conversion circuit i (i.e., the i-th power conversion circuit) for example, the power conversion circuit 41 adopts the half-bridge structure consisting of a capacitor C and power switches S1, S2. As shown in FIG. 3B, taking the power conversion circuit i (i.e., the i-th power conversion circuit) for example, the power conversion circuit 41 adopts the full-bridge structure consisting of a capacitor C and power switches S1, S2, S3 and S4. To facilitate description, the subsequent texts are mainly explained taking the power conversion circuits 41 as the half-bridge structure for example, but the disclosure is not limited thereto.

Figure 3C:
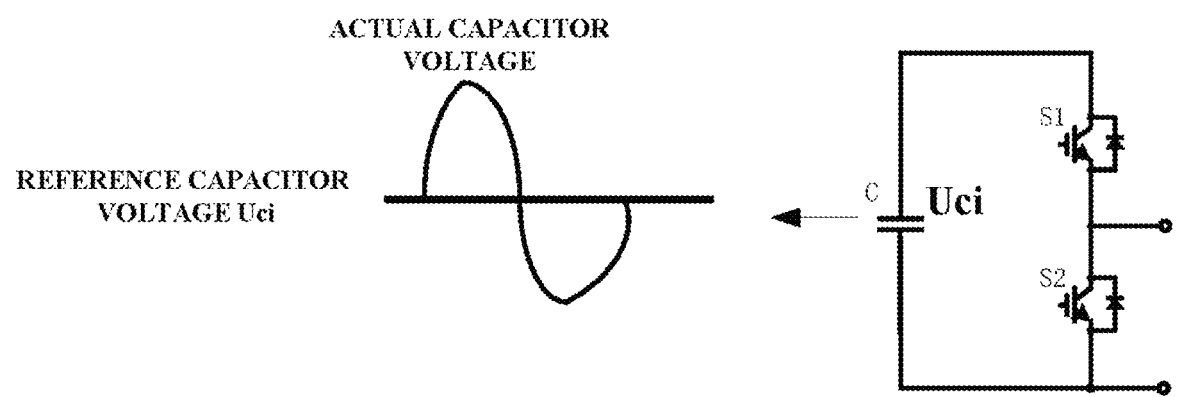
FIG. 3C illustrates a relationship between a reference capacitor voltage and an actual capacitor voltage of the capacitor of the power conversion circuit according to the disclosure.

FIG. 3C illustrates a relationship between a reference capacitor voltage and an actual capacitor voltage of the capacitor C of the power conversion circuit according to the disclosure. In the disclosure, the reference capacitor voltage of the capacitor C of the power conversion circuit is named as $U_{ci}$ (i=1, 2, . . . M, which represents the i-th power conversion circuit). Moreover, the reference capacitor voltages $U_{c1}$, $U_{c2}$ . . . $U_{cm}$ of the M power conversion circuits in each sub-module can be completely the same, and also can be partially the same, or can be totally different. As can be seen from FIG. 3C, the actual capacitor voltage of the capacitor C of the power conversion circuit of the disclosure fluctuates around the reference capacitor voltage.

Figure 4:
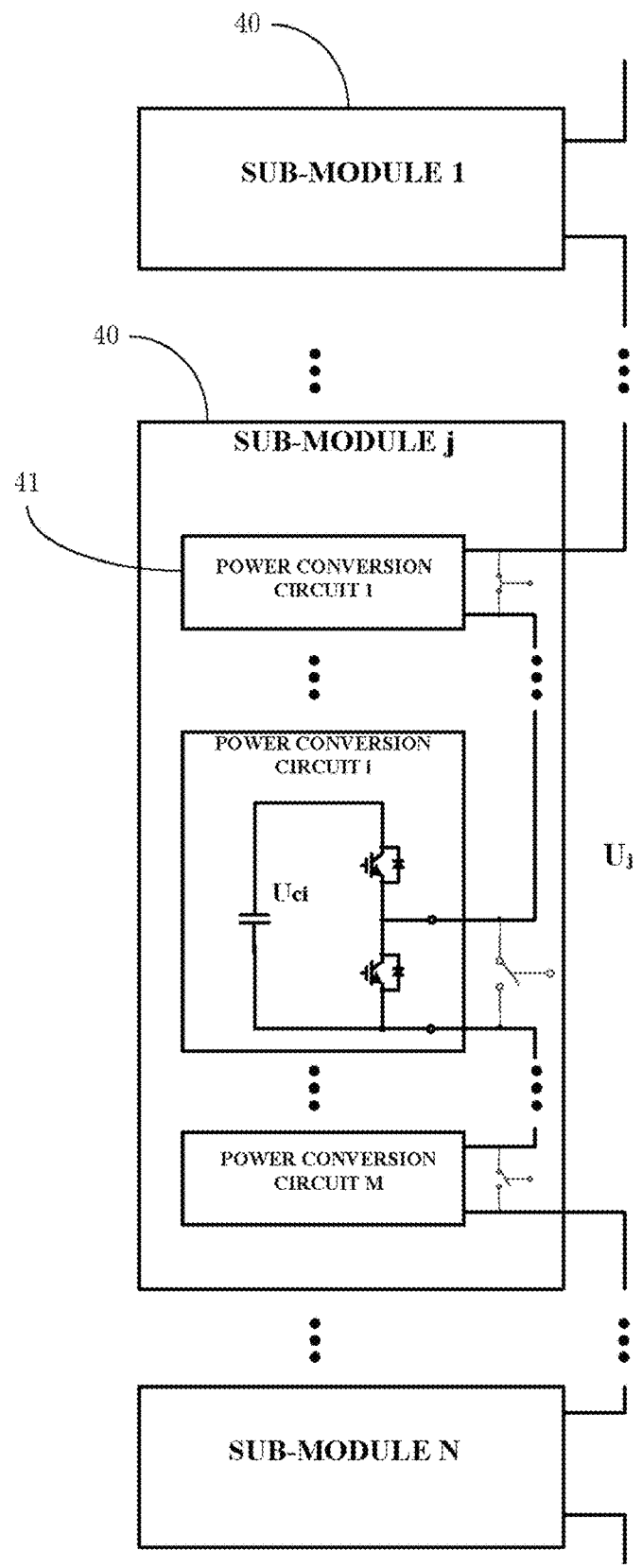
FIG. 4 illustrates different states of the bypass switch of the power conversion circuits in one sub-module of the MMC according to the disclosure, wherein when the bypass switch is off, the corresponding power conversion circuit is in a connection mode, when the bypass switch is on, the corresponding power conversion circuit is in a bypass mode, and the reference capacitor voltage of the sub-module is equal to a sum of reference voltages of the capacitors of the power conversion circuits in the connection mode.

As shown in FIG. 4, a sum of the reference capacitor voltages $\tau U_{ci}$ of the power conversion circuits in the connection mode within the sub-module j is referred to as the reference capacitor voltage of the sub-module j, and is defined as $U_j$ (j=1, 2 . . . N, which represents the j-th sub-module). In other words, in the disclosure, the reference capacitor voltage of the j-th sub-module is equal to a sum of reference voltages of the capacitors of the corresponding power conversion circuits in the connection mode, i.e., $U_j=\Sigma U_{ci}$, wherein i represents the power conversion circuits in the connection mode.

The disclosure divides the sub-modules with the same reference capacitor voltage in the same bridge arm into one group, i.e., a module. As shown in below table I, one bridge arm, for example, may include R modules. The reference capacitor voltage of the sub-modules in the k-th module is defined to be $U_{Mk}$ (k=1, 2 . . . R, which represents the k-th module), and the actual capacitor voltage of the sub-modules in the k-th module is defined to be $U_{Mk\_x}$ (k=1, 2 . . . R, which represents the k-th module; x=1, 2 . . . , which represents the x-th sub-module in the module). In the disclosure, the number of sub-modules in different modules may be the same, and also may be different.

TABLE I

| Voltage | | Module | | |
|---|---|---|---|---|
| | | Module 1 | Module 2 | . . . Module R |
| Reference capacitor voltage of the sub-module | | $U_{M1}$ | $U_{M2}$ | . . . $U_{MR}$ |
| Actual capacitor voltage of the sub-module | Sub-module voltage 1 | $U_{M1\_1}$ | $U_{M2\_1}$ | . . . $U_{MR\_1}$ |
| | Sub-module voltage 2 | $U_{M1\_2}$ | $U_{M2\_2}$ | . . . $U_{MR\_2}$ |
| | . . . | . . . | . . . | . . . . . . |
| | Sub-module voltage x | $U_{M1\_x}$ | $U_{M2\_x}$ | . . . $U_{MR\_x}$ |

In the disclosure, in a same module, a first voltage sequence can be obtained by sorting the actual capacitor voltages of the respective sub-modules. Among different modules, a second voltage sequence can be obtained by normalizing the actual capacitor voltage of each of the sub-modules into a corresponding normalized voltage, and then sorting the normalized voltages of all sub-modules in the bridge arm. Preferably, for example, a normalized coefficient can be obtained according to the reference capacitor voltages of the sub-modules, and then the actual capacitor voltage of each of the sub-modules is normalized into the corresponding normalized voltage according to the normalized coefficient. The disclosure does not limit the method of calculating the normalized coefficient, in one embodiment, for example, the normalized coefficient can be obtained by calculating a least common multiple of the reference capacitor voltages of the sub-modules of the plurality of modules. Of course, it can be understood that in other embodiments, the disclosure also can realize normalization through other normalization method, but is not limited thereto.

Taking Table I for example, the disclosure can obtain the first voltage sequence by sorting the actual capacitor voltages $U_{Mk\_x}$ of the sub-modules inside the k-th module. In the disclosure, the least common multiple (LCM) among the reference capacitor voltages $U_{M1}$, $U_{M2}$ $U_{MR}$ of the sub-modules of the R modules can be calculated firstly, and take the LCM as the normalized coefficient, and then multiply the actual capacitor voltages $U_{Mk\_x}$ of the sub-modules inside the k-th module by a multiple LCM/$U_{Mk}$, which also can be referred to as voltage normalization, so as to obtain the corresponding normalized voltage of the x-th sub-module in the k-th module (i.e., $U_{Mk\_x}*LCM/U_{Mk}$). Then, sorting the normalized voltages of all sub-modules in the same bridge arm to obtain the second voltage sequence.

Figure 5:
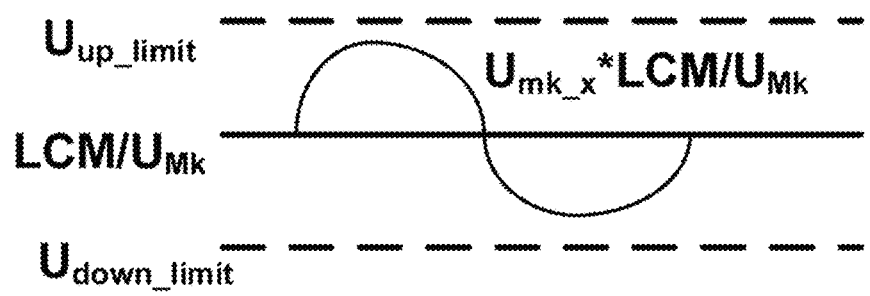
FIG. 5 illustrates a control state of a corresponding normalized voltage of the sub-module according to the disclosure, wherein LCM/U times of an actual capacitor voltage $U_{Mk\_x}$ (i.e., $U_{Mk\_x}*LCM/U_{Mk}$) of the x-th sub-module inside the k-th module is controlled within a certain range between the voltage upper limit and the voltage lower limit.

As shown in FIG. 5, the disclosure may further controls the corresponding normalized voltage of the x-th sub-module inside the k-th module (i.e., $U_{Mk\_x}*LCM/U_{Mk}$) within a certain range between voltage upper and lower limit, i.e., between a voltage upper limit $U_{up\_limit}$ and a voltage lower limit $U_{down\_limit}$.

Figure 6A:
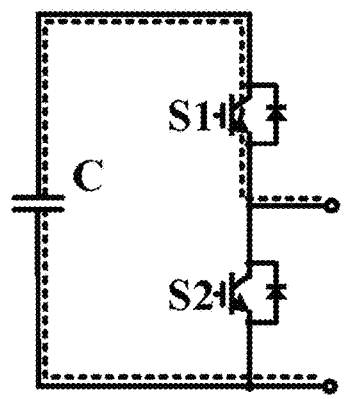
FIG. 6A illustrates a preferable switch-on state of the power conversion circuit according to the disclosure, wherein the corresponding sub-module is also in the switch-on state.

FIG. 6A illustrates a switch-on state of the power conversion circuit taking the half-bridge structure as example according to the disclosure, wherein a case that the power switch S1 is turned "on" and the power switch S2 is turned "off" is referred to as "switching on of the power conversion circuit", and a current flow path in the power conversion circuit is shown by a dashed line in the figure. Since same driving signal is used for all power conversion circuits in the connection mode in the same sub-module, the sub-module is also in a switch-on state, i.e., referred to as "switching on of the sub-module".

Figure 6B:
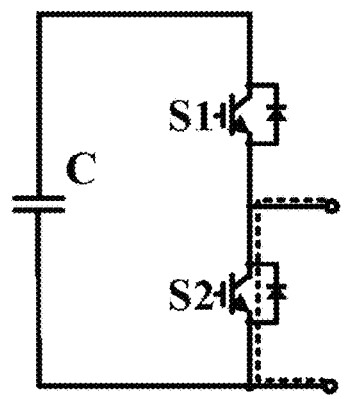
FIG. 6B illustrates a preferable switch-off state of the power conversion circuit according to the disclosure, wherein the corresponding sub-module is also in the switch-off state.

FIG. 6B illustrates a switch-off state of the power conversion circuit taking the half-bridge structure as example according to the disclosure, wherein a case that the power switch S2 is turned "on" and the power switch S1 is turned "off" is referred to as "switching off of the power conversion circuit", and a current flow path in the power conversion circuit is shown by a dashed line in the figure. Since same driving signal is used for all power conversion circuits in the connection mode use in the same sub-module, the sub-module is also in the switch-off state, i.e., referred to as "switching off of the sub-module".

Figure 7A:
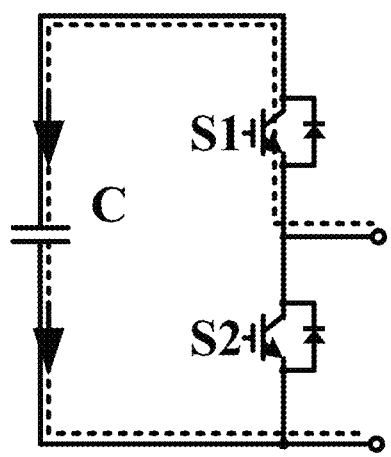
FIG. 7A illustrates a preferable charging state of the power conversion circuit according to the disclosure, wherein the corresponding sub-module is also in the charging state.

FIG. 7A illustrates a charging state of the power conversion circuit taking the half-bridge structure as example according to the disclosure, here, in the switch-on state, a current (shown by a dashed line in FIG. 7A) makes the capacitor C of the power conversion circuit in a charging state, i.e., referred to as "charging of the power conversion circuit". Since same driving signal is used for all power conversion circuits in the connection mode in the same sub-module, the sub-module is also in the charging state, i.e., referred to as "charging of the sub-module".

Figure 7B:
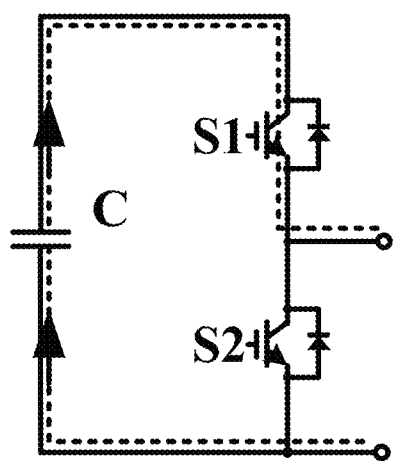
FIG. 7B illustrates a preferable discharging state of the power conversion circuit according to the disclosure, wherein the corresponding sub-module is also in the discharging state.

FIG. 7B illustrates a discharging state of the power conversion circuit taking the half-bridge structure as example according to the disclosure, here, in the switch-on state, a current (shown by a dashed line in FIG. 7B) makes the capacitor C of the power conversion circuit in a discharging state, i.e., referred to as "discharging of the power conversion circuit". Since same driving signal is used for all power conversion circuits in the connection mode in the same sub-module, the sub-module is also in the discharging state, i.e., referred to as "discharging of the sub-module".

Figure 8:
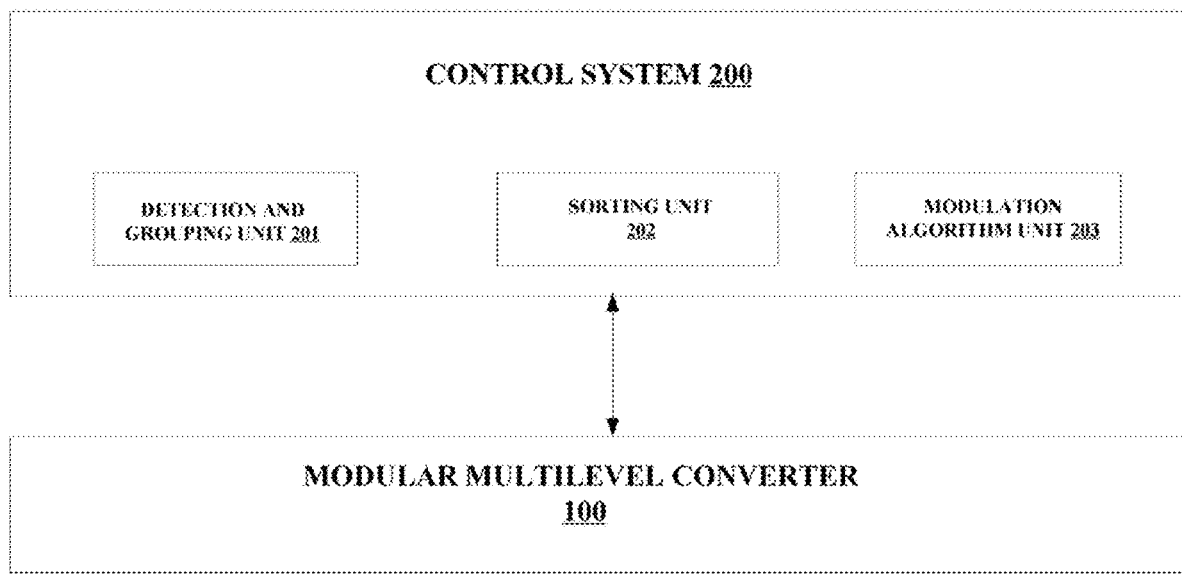
FIG. 8 is a structural diagram of a power transmission system according to the disclosure, wherein the power transmission system comprises a modular multilevel converter (MMC) and a control system.

As shown in FIG. 8, a power transmission system of the disclosure may include the modular multilevel converter (MMC) 100 and a control system 200. Structure of the modular multilevel converter (MMC) 100, for example, may be the structure shown in FIG. 1. The control system 200 is coupled to the modular multilevel converter 100, and controls the modular multilevel converter 100.

In the disclosure, the control system 200, may further include a detection and grouping unit 201, a sorting unit 202 and a modulation algorithm unit 203.

The detection and grouping unit 201 is configured for detecting an actual voltage of the capacitor of each power conversion circuit in each of the sub-modules, and calculating an actual capacitor voltage of each of the sub-modules; while calculating a reference capacitor voltage of each of the sub-modules according to a reference voltage of the capacitor of each power conversion circuit in each of the sub-modules; and dividing all sub-modules into a plurality of modules according to the reference capacitor voltage, wherein the reference capacitor voltages of the respective sub-modules in the same module are the same, and reference capacitor voltages of the sub-modules among different modules are different.

The sorting unit 202 is configured for sorting the actual capacitor voltages of the respective sub-modules in the same module to obtain a first voltage sequence. The sorting unit 202 is also configured for normalizing the actual capacitor voltage of each of the sub-modules into a corresponding normalized voltage and sorting the normalized voltages of all sub-modules among different modules to obtain a second voltage sequence.

The modulation algorithm unit 203 is configured for determining the sub-modules to be switched on or switched off according to charging and discharging states of each sub-module, the first voltage sequence and the second voltage sequence, until an actual level of the bridge arm is consistent with a desired level, wherein the actual level of the bridge arm corresponds to a sum of the actual capacitor voltages of the plurality of sub-modules in a switch-on state, and the desired level changes with a step of a first preset value. Preferably, the first preset value, for example, may be an integer multiple of the least common multiple of the reference capacitor voltages of the sub-modules of the plurality of modules.

Figure 9:
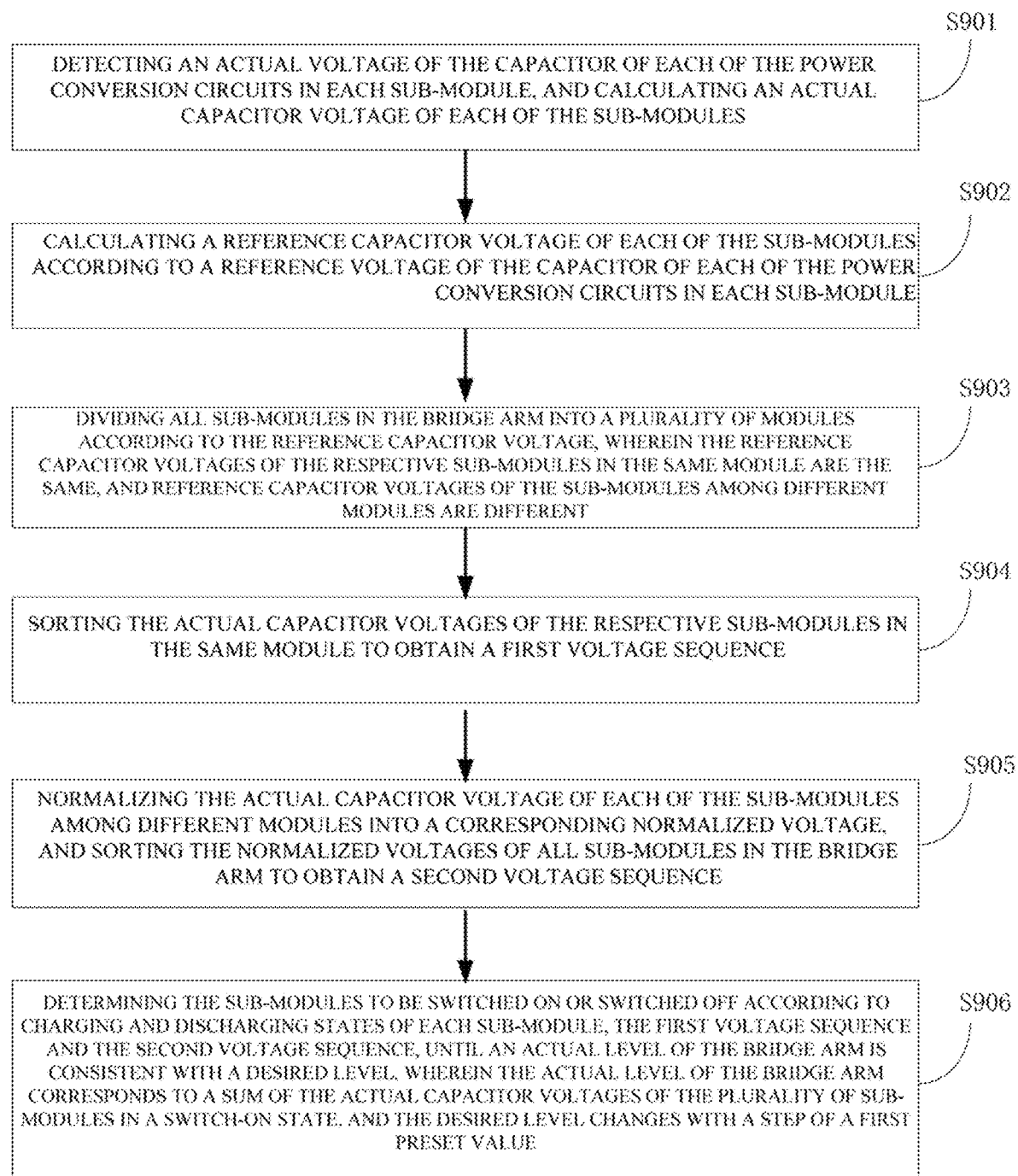
FIG. 9 is a schematic diagram of a control method for a modular multilevel converter (MMC) according to the disclosure.

Correspondingly, as shown in FIG. 9, the control method for a modular multilevel converter (MMC) mainly includes following steps.

Step S901, detecting an actual voltage of the capacitor of each of the power conversion circuits in each sub-module, and calculating an actual capacitor voltage of each of the sub-modules.

Step S902, calculating a reference capacitor voltage of each of the sub-modules according to a reference voltage of the capacitor of each of the power conversion circuits in each sub-module.

Step S903, dividing all sub-modules in the bridge arm into a plurality of modules according to the reference capacitor voltage, wherein the reference capacitor voltages of the respective sub-modules in the same module are the same, and reference capacitor voltages of the sub-modules among different modules are different.

Step S904, sorting the actual capacitor voltages of the respective sub-modules in the same module to obtain a first voltage sequence.

Step S905, normalizing the actual capacitor voltage of each of the sub-modules among different modules into a corresponding normalized voltage, and sorting the normalized voltages of all sub-modules in the bridge arm to obtain a second voltage sequence.

Step S906, determining the sub-modules to be switched on or switched off according to charging and discharging states of each sub-module, the first voltage sequence and the second voltage sequence, until an actual level of the bridge arm is consistent with a desired level, wherein the actual level of the bridge arm corresponds to a sum of the actual capacitor voltages of the plurality of sub-modules in a switch-on state, and the desired level changes with a step of a first preset value.

Preferably, in the disclosure, the step of determining the sub-modules to be switched on or switched off according to the charging and discharging states of each sub-module, the first voltage sequence and the second voltage sequence includes following operations.

When an initial level of the bridge arm is less than the desired level, if the sub-modules are in charging state, selecting the sub-module with a minimum normalized voltage to switch on according to the second voltage sequence; if the sub-modules are in discharging state, selecting the sub-module with a maximum normalized voltage to switch on according to the second voltage sequence.

When the initial level of the bridge arm is greater than the desired level, if the sub-modules are in charging state, selecting the sub-module with a maximum normalized voltage to switch off according to the second voltage sequence; if the sub-modules are in discharging state, selecting the sub-module with a minimum normalized voltage to switch off according to the second voltage sequence.

Preferably, in the disclosure, after determining the sub-modules to be switched on, the method may further include following steps.

After the switching on operation, obtaining a calculated level of the bridge arm according to the actual capacitor voltages of the sub-modules in the switch-on state; when the calculated level is less than the desired level, if the sub-modules are in charging state, continuing to select the sub-module with a minimum normalized voltage to switch on according to the second voltage sequence, until the actual level of the bridge arm is greater than or equal to the desired level. If the sub-modules are in discharging state, continuing to select the sub-module with the maximum normalized voltage to switch on according to the second voltage sequence, until the actual level of the bridge arm is greater than or equal to the desired level. In particular, when the actual level of the bridge arm is greater than the desired level, the following operations are further performed.

When the calculated level is greater than the desired level, if the sub-modules are in charging state, selecting at least one sub-module with higher actual capacitor voltage in at least one module to switch off, or selecting at least one sub-module with lower actual capacitor voltage in at least one module to switch on while selecting the sub-module with higher actual capacitor voltage in at least one module to switch off according to the first voltage sequence and the second voltage sequence. If the sub-modules are in discharging state, selecting at least one sub-module with lower actual capacitor voltage in at least one module to switch off, or selecting at least one sub-module with higher actual capacitor voltage in at least one module to switch on while selecting at least one sub-module with lower actual capacitor voltage in at least one module to switch off according to the first voltage sequence and the second voltage sequence.

When the actual level of the bridge arm is equal to the desired level, the switching on or switching off operation of the sub-modules should be ended.

For example, when the calculated level is greater than the desired level, if the sub-modules are in charging state, the sub-module with the maximum actual capacitor voltage in the module with a minimum reference capacitor voltage may be selected to switch off according to the first voltage sequence and the second voltage sequence, or in one embodiment, the sub-module with a maximum actual capacitor voltage in the module with a higher reference capacitor voltage also may be selected to switch off while selecting the sub-module with a minimum actual capacitor voltage in the module with a lower reference capacitor voltage to switch on according to the first voltage sequence and the second voltage sequence, such that the actual level of the bridge arm is equal to the desired level. If the sub-modules are in discharging state, the sub-module with a minimum actual capacitor voltage in the module with a minimum reference capacitor voltage may be selected to switch off according to the first voltage sequence and the second voltage sequence, or in one embodiment, the sub-module with a minimum actual capacitor voltage in the module with a higher reference capacitor voltage also may be selected to switch off while selecting the sub-module with a maximum actual capacitor voltage in the module with a lower reference capacitor voltage to switch on according to the first voltage sequence and the second voltage sequence, such that the actual level of the bridge arm is equal to the desired level. When the actual level of the bridge arm is equal to the desired level, the switching on or switching off operation of the sub-modules should be ended.

In another embodiment, in the disclosure, after determining the sub-modules to be switched off, the method may further include following steps.

After the switching off operation, obtaining a calculated level of the bridge arm according to the actual capacitor voltages of the sub-modules in the switch-on state; when the calculated level is greater than the desired level, if the sub-modules are in charging state, continuing to select the sub-module with a maximum normalized voltage to switch off according to the second voltage sequence, until the actual level of the bridge arm is less than or equal to the desired level. If the sub-modules are in discharging state, continuing to select the sub-module with a minimum normalized voltage to switch off according to the second voltage sequence, until the actual level of the bridge arm is less than or equal to the desired level. In particular, when the actual level of the bridge arm is less than the desired level, the following operations are further performed.

When the calculated level is less than the desired level, if the sub-modules are in charging state, selecting at least one sub-module with lower actual capacitor voltage in at least one module to switch on, or selecting at least one sub-module with lower actual capacitor voltage in at least one module to switch on while selecting at least one sub-module with higher actual capacitor voltage in at least one module to switch off according to the first voltage sequence and the second voltage sequence. If the sub-modules are in discharging state, selecting at least one sub-module with a higher actual capacitor voltage in at least one module to switch on, or selecting at least one sub-module with higher actual capacitor voltage in at least one group to switch on while selecting at least one sub-module with lower actual capacitor voltage in at least one module to switch off according to the first voltage sequence and the second voltage sequence. When the actual level of the bridge arm is equal to the desired level, the switching on or switching off operation of the sub-modules should be ended.

For example, when the calculated level is less than the desired level, if the sub-modules are in charging state, the sub-module with a minimum actual capacitor voltage in the module with a minimum reference capacitor voltage may be selected to switch on according to the first voltage sequence and the second voltage sequence, or in one embodiment, the sub-module with a minimum actual capacitor voltage in the module with a higher reference capacitor voltage also may be selected to switch on while selecting the sub-module with a maximum actual capacitor voltage in the module with a lower reference capacitor voltage to switch off according to the first voltage sequence and the second voltage sequence. If the sub-modules are in discharging state, the sub-module with a maximum actual capacitor voltage in the module with a minimum reference capacitor voltage may be selected to switch on according to the first voltage sequence and the second voltage sequence, or in one embodiment, the sub-module with a maximum actual capacitor voltage in the module with a higher reference capacitor voltage also may be selected to switch on while selecting the sub-module with a minimum actual capacitor voltage in the module with a lower reference capacitor voltage to switch off according to the first voltage sequence and the second voltage sequence.

Actually, there are multiple embodiments of combination of switching on and switching off the sub-modules, but the disclosure is not limited thereto, only if the actual level of the bridge arm can be consistent with the desired level.

Preferably, in order to realize better voltage equalization control effect, and ensure capacitor voltages of all sub-modules within an allowable voltage range, in the disclosure, after determining the sub-modules to be switched on or switched off according to the charging and discharging states of each sub-module, the first voltage sequence and the second voltage sequence, the control method may further include following steps: when the normalized voltage of one of the plurality of sub-modules is greater than a voltage upper limit, or less than a voltage lower limit, replacing such sub-module by at least one sub-module selected from the remaining of the plurality of sub-modules according to the charging and discharging states of the sub-module, the first voltage sequence and the second voltage sequence, such that the actual level of the bridge arm keeps constant.

In some embodiments, the step of replacement may include following operations.

If the sub-modules are in charging state, when the normalized voltage of one of the plurality of sub-modules in the switch-on state is greater than the voltage upper limit, switching off such sub-module, and selecting at least one of the remaining of the plurality of sub-modules to replace such sub-module according to the first voltage sequence and the second voltage sequence, so as to keep the actual level of the bridge arm constant.

If the sub-modules are in charging state, when the normalized voltage of one of the plurality of sub-modules in the switch-off state is less than the voltage lower limit, switching on such sub-module, and selecting at least one of the remaining of the plurality of sub-modules to replace such sub-module according to the first voltage sequence and the second voltage sequence, so as to keep the actual level of the bridge arm constant.

If the sub-modules are in discharging state, when the normalized voltage of one of the plurality of sub-modules in the switch-on state is less than the voltage lower limit, switching off such sub-module, and selecting at least one of the remaining of the plurality of sub-modules to replace such sub-module according to the first voltage sequence and the second voltage sequence, so as to keep the actual level of the bridge arm constant.

If the sub-modules are in discharging state, when the normalized voltage of one of the plurality of sub-modules in the switch-off state is greater than the voltage upper limit, switching on such sub-module, and selecting at least one of the remaining of the plurality of sub-modules to replace such sub-module according to the first voltage sequence and the second voltage sequence, so as to make the actual level of the bridge arm keep constant.

Figure 10A:
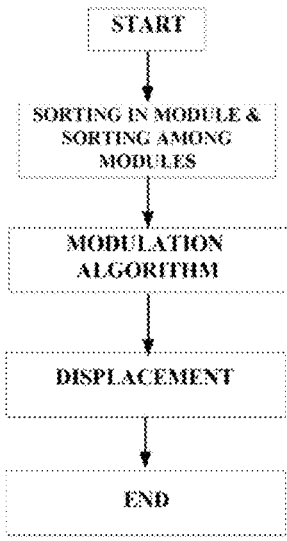
FIG. 10A is flow diagram of a preferable control method for a modular multilevel converter (MMC) according to the disclosure.

FIG. 10A illustrates a preferable control method for a modular multilevel converter (MMC) according to the disclosure, wherein the control method are mainly formed of three parts: sorting in the module and sorting among the modules, modulation algorithm, and replacement. Sorting in the module and sorting among the modules have been described in detail above, so no repetition here.

Figure 10B:
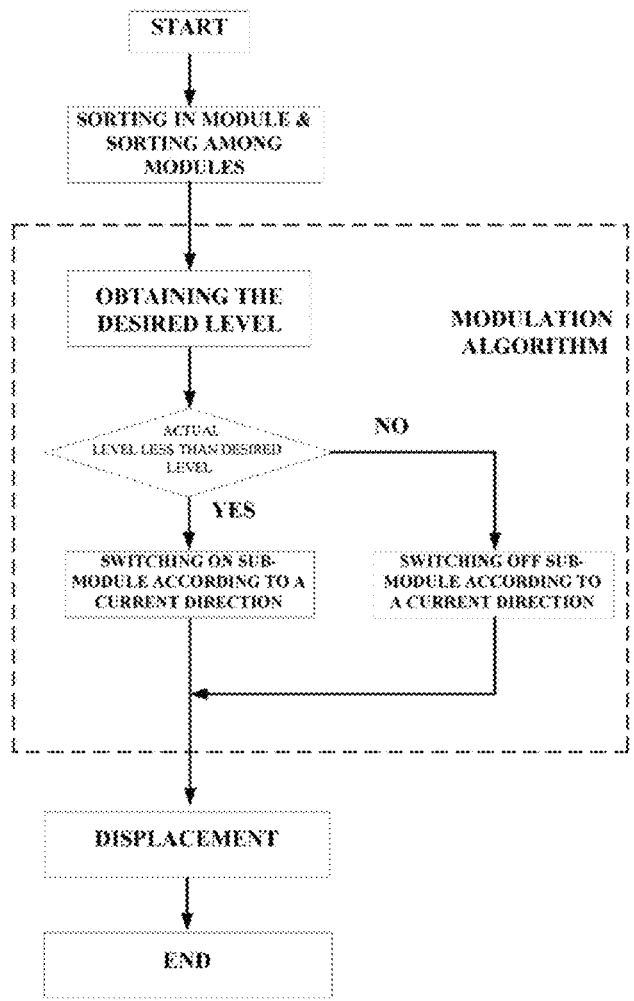
FIG. 10B illustrates flow diagram of a preferable embodiment of a modulation algorithm step in FIG. 10A.

FIG. 10B further illustrates a preferable embodiment of a modulation algorithm step in FIG. 10A. Firstly, a desired level is obtained, and when the actual level is less than the desired level, the sub-modules to be switched on is determined according to charging and discharging state of the sub-modules, sorting results in the module (i.e., the first voltage sequence) and sorting results among the modules (i.e., the second voltage sequence); when the actual level is greater than the desired level, the sub-modules to be switched off is determined according to charging and discharging state of the sub-modules, sorting results in the module (i.e., the first voltage sequence) and sorting results among the modules (i.e., the second voltage sequence).

Figure 10C:
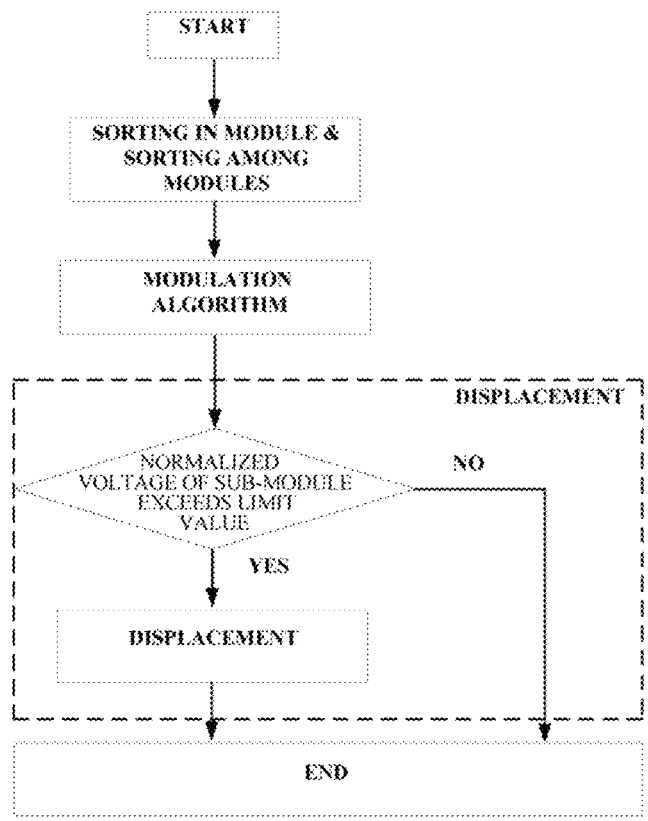
FIG. 10C illustrates flow diagram of a preferable embodiment of a replacement step in FIG. 10A.

FIG. 10C further illustrates a preferable embodiment of a replacement step in FIG. 10A. The switch-on or switch-off state of sub-modules with the normalized voltages greater than the voltage upper limit $U_{up\_limit}$ (or less than the voltage lower limit $U_{down\_limit}$) and remaining sub-modules with lower (or higher) normalized voltages are exchanged according to whether the corresponding normalized voltage of the sub-module exceeds the voltage upper limit $U_{up\_limit}$ or the voltage lower limit $U_{down\_limit}$, charging and discharging state of the sub-modules, the second voltage sequence and the first voltage sequence.

Figure 11A:
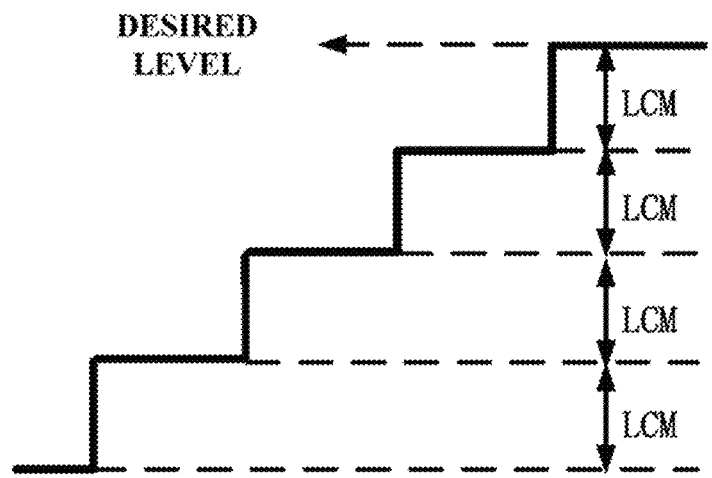
FIG. 11A illustrates a changing mode of an increased desired level in the modulation algorithm step according to the disclosure.
Figure 11B:
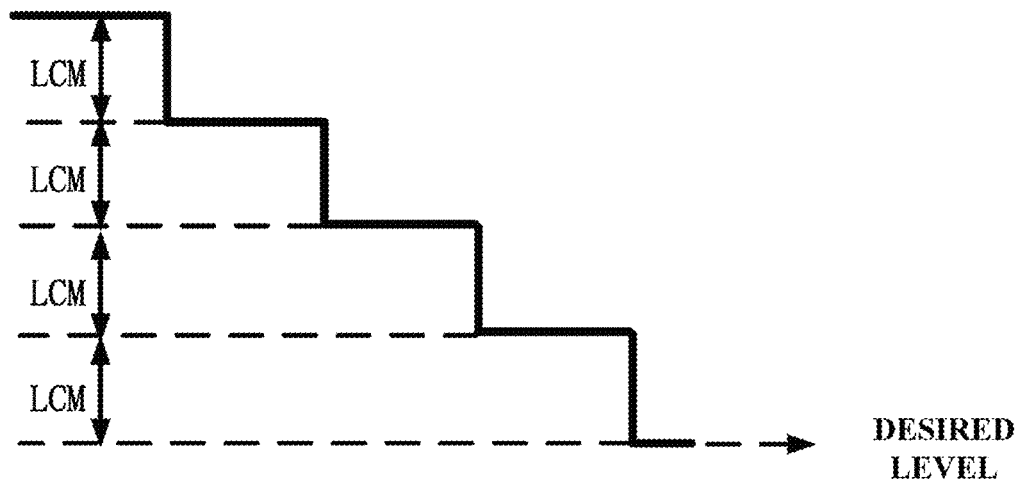
FIG. 11B illustrates a changing mode of a decreased desired level in the modulation algorithm step according to the disclosure.

FIGS. 11A and 11B respectively illustrate changing modes of the increased desired level and the decreased desired level in the modulation algorithm step according to the disclosure. In the disclosure, the final object of the modulation algorithm step is to make the actual level of the bridge arm to be consistent with the desired level. Moreover, regardless of increased desired level or decreased desired level, a changing step of the desired level is based on the first preset value (e.g., LCM or an integer multiple of LCM). In this embodiment, the changing step of the desired level is LCM.

Figure 11C:
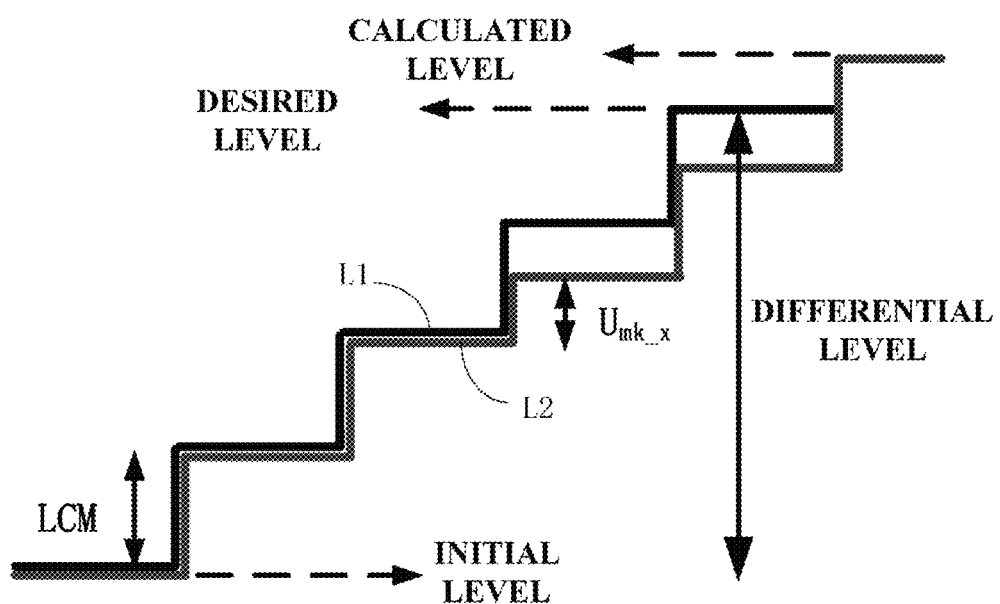
FIG. 11C illustrates a preferable level changing mode in the modulation algorithm step according to the disclosure, wherein line L1 represents the desired level and changing mode of the desired level, line L2 represents changing mode of an actual level from an initial level to a calculating level, and the desired level changes with a step of LCM.
Figure 11D:
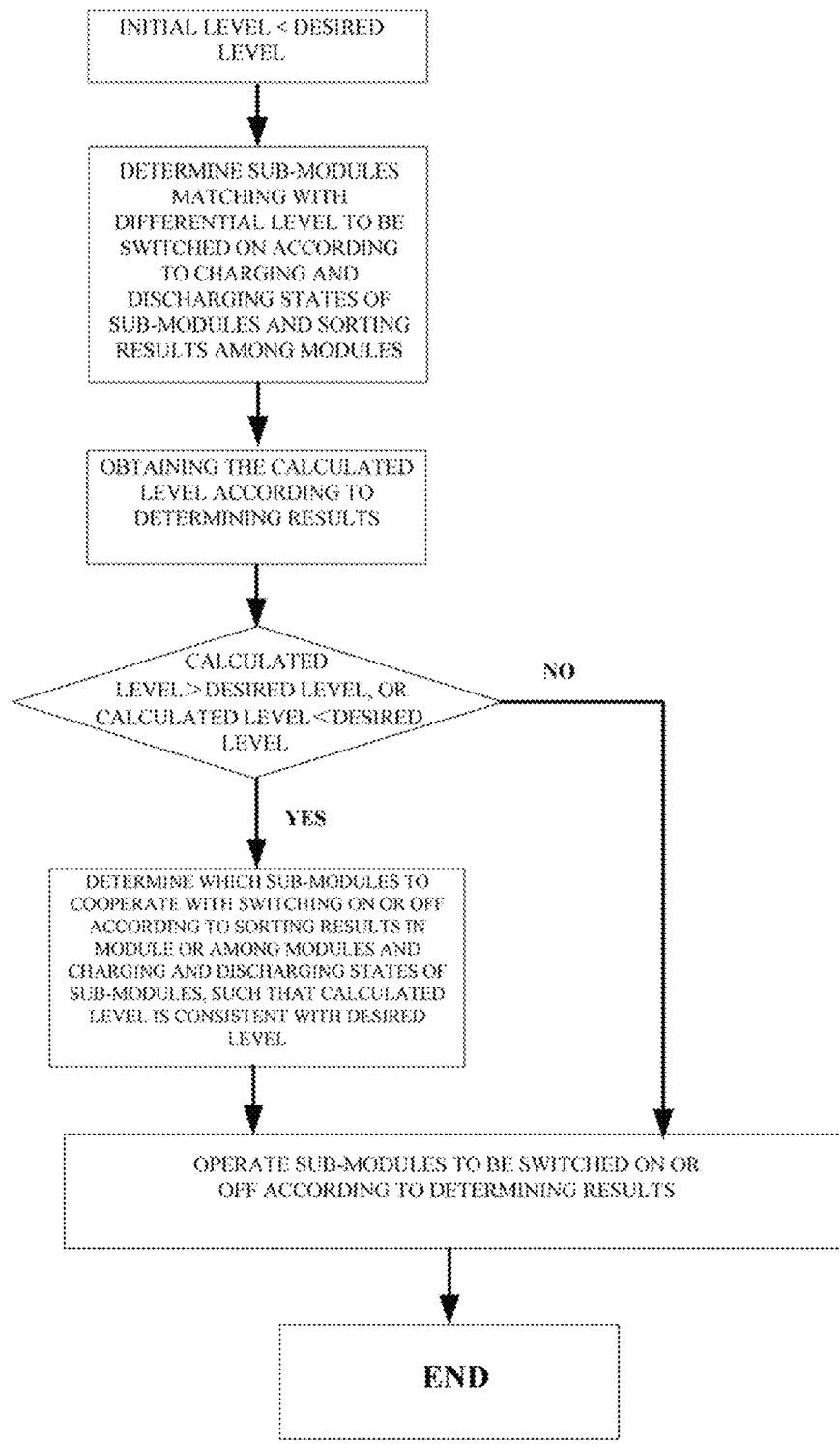
FIG. 11D is flow diagram of a corresponding modulation algorithm of the changing mode shown in FIG. 11C.
Figure 11E:
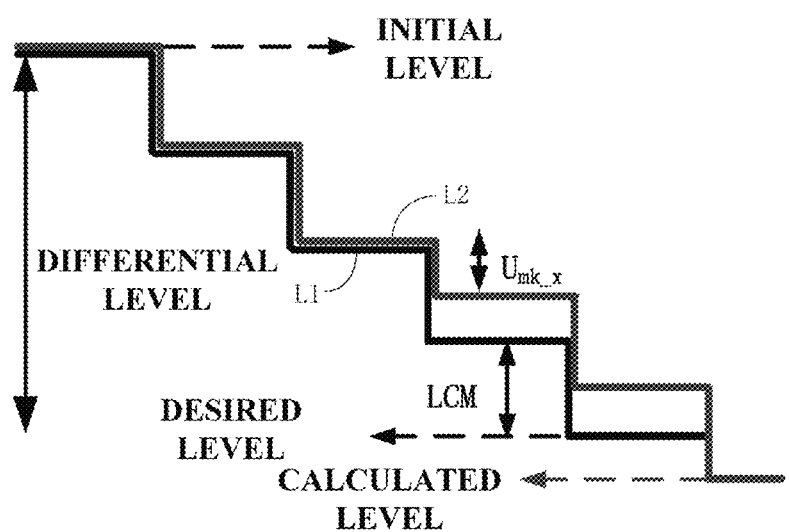
FIG. 11E illustrates another preferable level changing mode in the modulation algorithm according to the disclosure, wherein line L1 represents the desired level and changing mode of the desired level, line L2 represents changing mode of an actual level from an initial level to a calculated level, and the desired level changes with a step of LCM.

FIGS. 11C and 11E respectively illustrate two different level changing modes in the modulation algorithm step according to the disclosure, wherein line L1 represents the desired level and changing of the desired level with a step of LCM, line L2 represents changing of the actual level from an initial level to a calculated level. Moreover, in the modulation algorithm step, a difference between the initial level and the desired level is referred to as a differential level.

In the modulation algorithm step of the disclosure, there are several methods to switch on or switch off the sub-modules according to charging and discharging state of the sub-modules, the first voltage sequence and the second voltage sequence. For example, the following methods may be adopted: (1) determining according to value of the initial level and the desired level, when the initial level is less than the desired level, switching on the sub-modules matching with the differential level, and when the initial level is greater than the desired level, switching off the sub-modules matching with the differential level; (2) determining sub-modules to be switched on or switched off merely according to value of the desired level. Hereinafter the method (1) is explained for example, but the disclosure shall not be limited thereto.

As shown in FIG. 11D, if the initial level is less than the desired level, firstly, the sub-modules matching with the differential level are determined to be switched on according to the second voltage sequence and the charging and discharging states of the sub-modules, and the calculated level is obtained according to the determined results. However, since the reference capacitor voltages of the sub-modules among different modules may not be equal to the LCM, the calculated level may not be completely consistent with the desired level. If the calculated level is greater than or equal to the desired level, an adjustment need to be performed according to the first voltage sequence or the second voltage sequence and the charging and discharging states of the sub-modules with switching on or switching off some sub-modules or simultaneously switch on and switch off some sub-modules, such that the actual level of the bridge arm is consistent with the desired level finally.

Figure 11F:
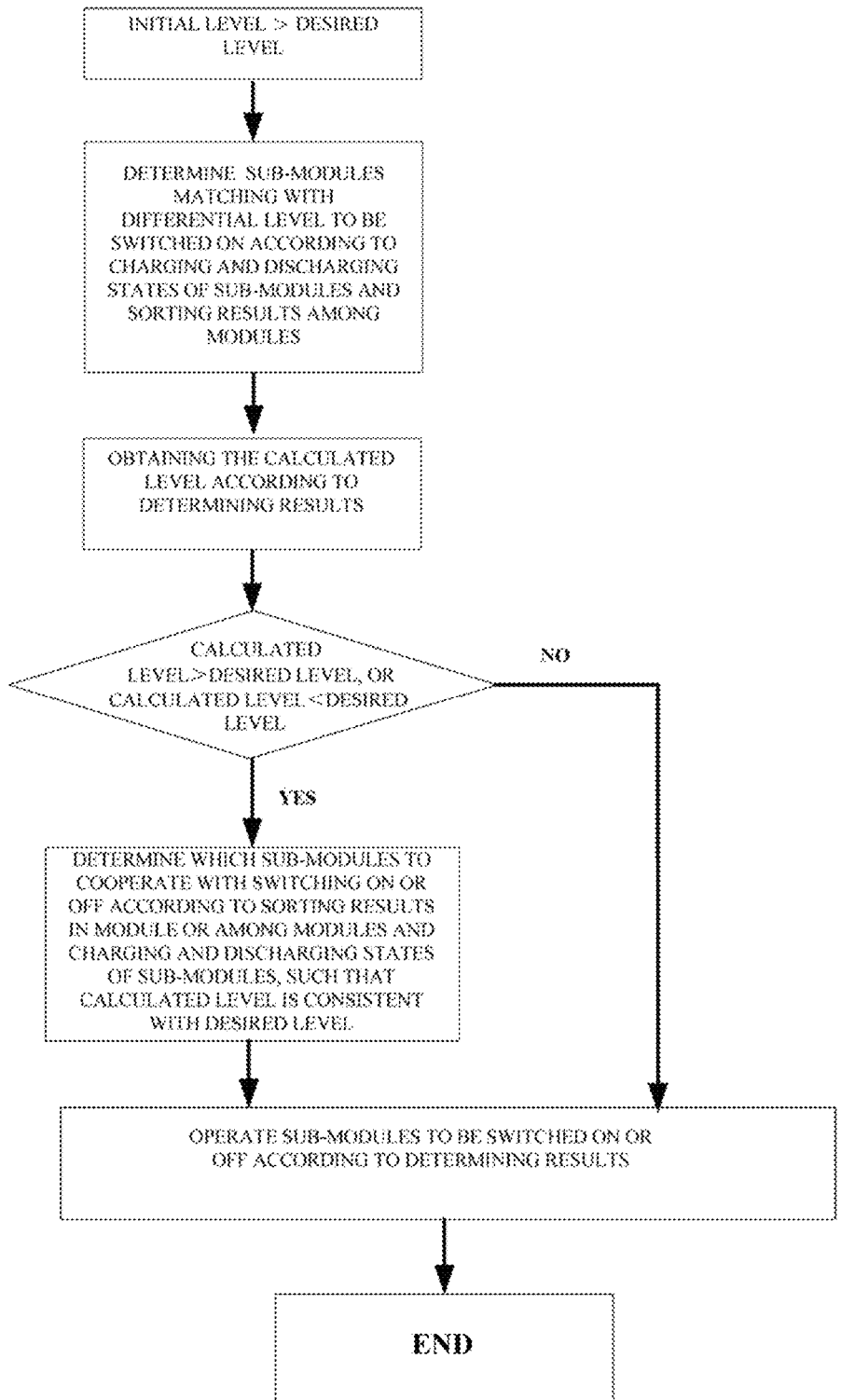
FIG. 11F is flow diagram of modulation algorithm corresponding to the changing mode shown in FIG. 11E.

As shown in FIG. 11F, if the initial level is greater than the desired level, firstly, the sub-modules marching with the differential level are determined to be switched off according to the second voltage sequence and the charging and discharging states of the sub-modules, and the calculated level is obtained according to the determined results. However, since the reference capacitor voltages of the sub-modules among different modules may not be equal to the LCM, the calculated level may not be consistent with the desired level, resulting in a calculated level is greater than or less than the desired level. Therefore, an adjustment needs to be performed according to the first voltage sequence or the second voltage sequence and the charging and discharging states of the sub-modules with switching on or switching off some sub-modules or simultaneously switching on and switching off some sub-modules, such that the actual level of the bridge arm is consistent with the desired level finally.

Figure 12A:
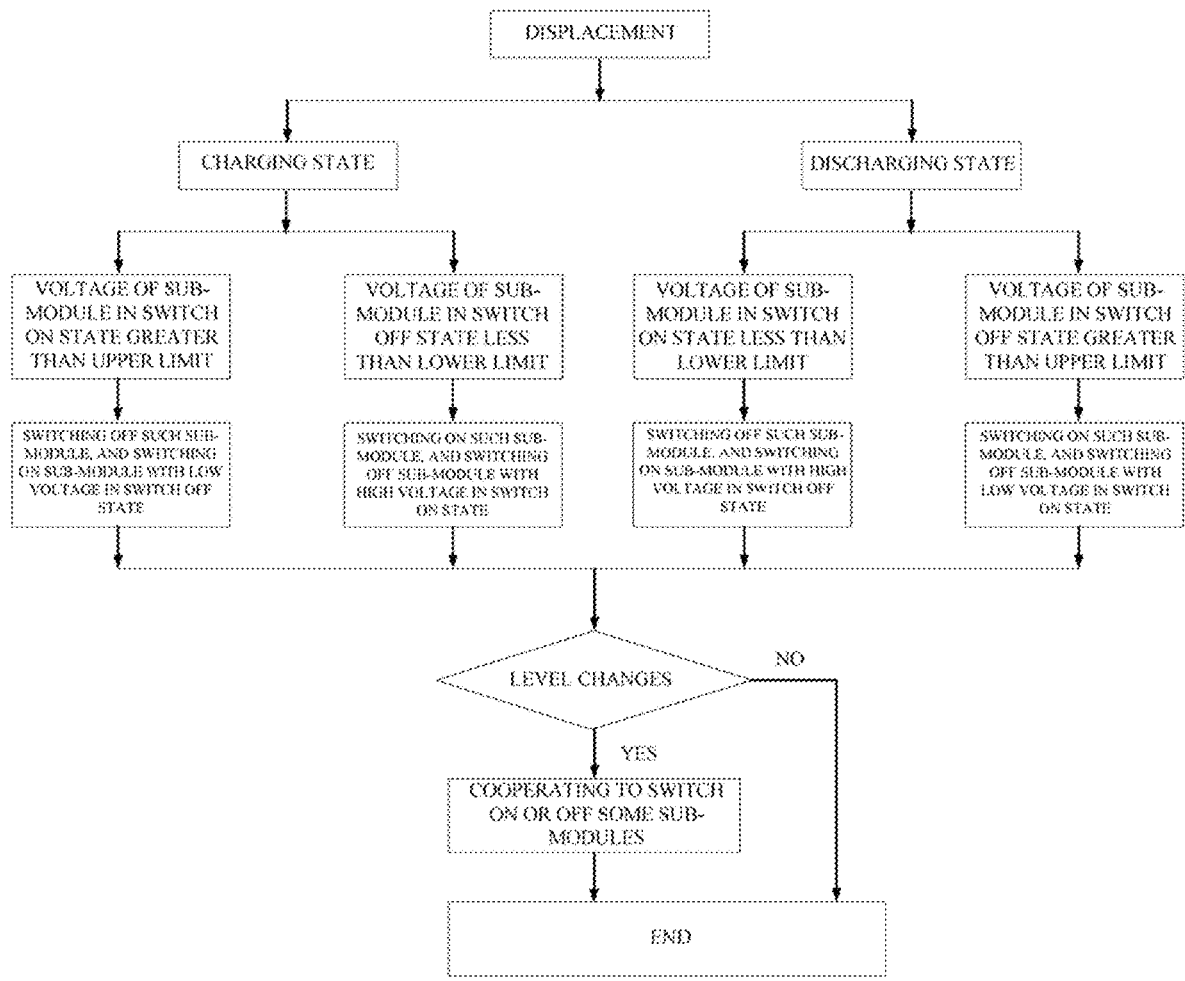
FIG. 12A is flow diagram of the replacement step according to the disclosure.

FIG. 12A illustrates the replacement step according to the disclosure. (1) Assuming that the sub-module is in charging (i.e., the sub-module is in a charging state), if the normalized voltage corresponding to the sub-module in the switch-on state is greater than the voltage upper limit $U_{up\_limit}$, such sub-module is switched off, and at the same time other sub-modules with lower normalized voltages in the switch-off state are switched on according to the second voltage sequence, while ensuring the actual level of the bridge arm to keep constant; (2) assuming that the sub-module is in charging (i.e., the sub-module is in a charging state), if the normalized voltage corresponding to the sub-module in the switch-off state is less than the voltage lower limit $U_{down\_limit}$, such sub-module is switched on, and other sub-modules with higher normalized voltages in the switch-on state are switched off according to the second voltage sequence, while ensuring the actual level of the bridge arm to keep constant; (3) assuming that the sub-module is in discharging (i.e., the sub-module is in a discharging state), if the normalized voltage corresponding to the sub-module in the switch-on state is less than the voltage lower limit $U_{down\_limit}$, such sub-module is switched off, and other sub-modules with higher normalized voltages in the switch-off state are switched on according to the second voltage sequence, while ensuring the actual level of the bridge arm to keep constant; (4) assuming that the sub-module is in discharging (i.e., the sub-module is in a discharging state), if the normalized voltage corresponding to the sub-module in the switch-off state is greater than the voltage upper limit $U_{up\_limit}$, such sub-module is switched on, and other sub-modules with lower normalized voltages in the switch-on state are switched off according to the second voltage sequence, while ensuring the actual level of the bridge arm to keep constant.

Figure 12B:
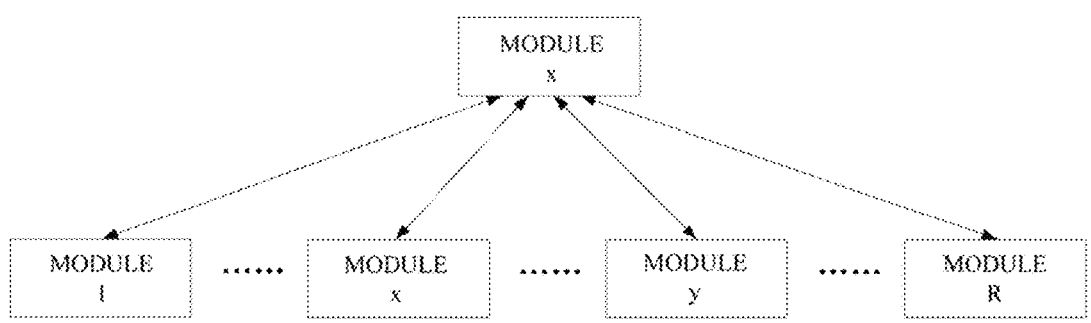
FIG. 12B is a schematic diagram of effects produced by the replacement step shown in FIG. 12A.

As shown in FIG. 12B, the above four cases will result in the following two effects: (1) when the switch-on or switch-off state of the sub-modules inside the module (such as, inside the module x) exchange, the actual level of the bridge arm does not change, then replacement is ended; (2) when the switch-on or switch-off state of the sub-modules among the different modules (such as, the module x and the module y) exchange, some sub-modules need to be further switched on or switched off, such that the actual level of the bridge arm keeps constant.

Hereinafter taking R=2 (i.e., total two modules: module 1 and module 2), $U_{M1}$=1K, $U_{M2}$=2 KV, and LCM=2 KV as example to describe the voltage equalization control of the sub-modules through the control method of the disclosure in detail.

Step 1: assuming that in one bridge arm, the number of sub-modules in the module 1 is M1, the number of sub-modules in the module 2 is M2, the reference capacitor voltage of the sub-modules in the module 1 is $U_{M1}=1$ KV, and the reference capacitor voltage of the sub-modules in the module 2 is $U_{M2}=2$ KV, so it is calculated that the least common multiple LCM of the reference capacitor voltages of the sub-modules of the two modules is 2 KV, which is defined as the normalized coefficient, and setting the voltage upper limit to be $U_{up\_limit}$, and the voltage lower limit to be $U_{down\_limit}$;

Step 2: sorting the actual capacitor voltage $U_{M1\_x}$ (x=1, 2 ... M1, which represents the x-th sub-module in the module 1) of the M1 sub-modules in the module 1 to obtain the first voltage sequence;

Step 3: sorting the actual capacitor voltage $U_{M2\_x}$ (x=1, 2 ... M2, which represents the x-th sub-module in the module 2) of the M2 sub-modules in the module 2 to obtain the first voltage sequence;

Step 4: according to the normalized coefficient LCM, normalizing the actual capacitor voltage $U_{M1\_x}$ of the M1 sub-modules in the module 1 into a corresponding normalized voltage, in this embodiment, multiplying $U_{M1\_x}$ by LCM/$U_{M1}$ (i.e., 2*$U_{M1\_x}$) to obtain the corresponding normalized voltage of each of the M1 sub-modules; normalizing the actual capacitor voltage $U_{M2\_x}$ of the M2 sub-modules in the module 2 into a corresponding normalized voltage, in this embodiment, multiplying $U_{M2\_x}$ by LCM/$U_{M2}$ (i.e., 1*$U_{M1\_x}$) to obtain the corresponding normalized voltage of each of the M2 sub-modules, thereby sorting the normalized voltages of the M1+M2 sub-modules among these modules to obtain the second voltage sequence;

Step 5: generating the desired level taking the first preset value as the step, wherein the first preset value is an integer multiple of the least common multiple LCM;

Step 6: obtaining the desired level according to closed-loop control, for example, the desired level can jump taking LCM as the step, and determining values of the initial level and the desired level, and if the initial level is less than the desired level, executing step 7; if the initial level is greater than the desired level, executing step 8; if the initial level is equal to the desired level, executing step 9;

Step 7: selecting the sub-module matching with the differential level to be switched on according to the charging and discharging states of the sub-modules and the second voltage sequence; after switching on, obtaining the calculated level according to the actual capacitor voltage of the switched on sub-module; when the calculated level is greater than or less than the desired level, continuing to determine the sub-modules to be switched on or switched off according to the first voltage sequence, the second voltage sequence and the charging and discharging states of the sub-modules, until the actual level of the bridge arm is equal to the desired level; when the calculated level is equal to the desired level, ending switching on or switching off operations of the sub-modules, and executing step 9;

Step 8: selecting the sub-module matching with the differential level to be switched off according to the charging and discharging states of the sub-modules and the second voltage sequence; after switching off, obtaining the calculated level according to the actual capacitor voltage of the switched on sub-module; when the calculated level is greater than or less than the desired level, continuing to determine the sub-modules to be switched on or switched off according to the first voltage sequence, the second voltage sequence and the charging and discharging states of the sub-modules, until the actual level of the bridge arm is equal to the desired level; when the calculated level is equal to the desired level, ending switching on or switching off operations of the sub-modules, and executing step 9;

Next, the steps of replacement is as follows.

Step 9: determining whether the corresponding normalized voltages of the M1+M2 sub-modules in the switch-on and switch-off states exceed the voltage limits, specifically, if the sub-modules are in charging state, when the normalized voltage of one sub-module in the switch-on state is greater than the voltage upper limit, executing step 10; when the normalized voltage of one sub-module in the switch-off state is less than the voltage lower limit, executing step 11; if the sub-modules are in discharging state, when the normalized voltage of one sub-module in the switch-on state is less than the voltage lower limit, executing step 12; when the normalized voltage of one sub-module in the switch-off state is greater than the voltage upper limit, executing step 13.

Step 10: switching off such sub-module, selecting one or more sub-modules with lower normalized voltages from the remaining sub-modules in the switch-off state to be switched on according to the first voltage sequence and the second voltage sequence, and keeping the actual level of the bridge arm to be constant; then executing step 14;

Step 11: switching on such sub-module, selecting one or more sub-modules with higher normalized voltages from the remaining sub-modules in the switch-on state to be switched off according to the first voltage sequence and the second voltage sequence, and keeping the actual level of the bridge arm to be constant; then executing step 14;

Step 12: switching off such sub-module, selecting one or more sub-modules with higher normalized voltages from the remaining sub-modules in the switch-off state to be switched on according to the first voltage sequence and the second voltage sequence, and keeping the actual level of the bridge arm to be constant; then executing step 14;

Step 13: switching on such sub-module, selecting one or more sub-modules with lower normalized voltages from the remaining sub-modules in the switch-on state to be switched off according to the first voltage sequence and the second voltage sequence, and keeping the actual level of the bridge arm to be constant; then executing step 14;

Step 14: end.

Figure 13:
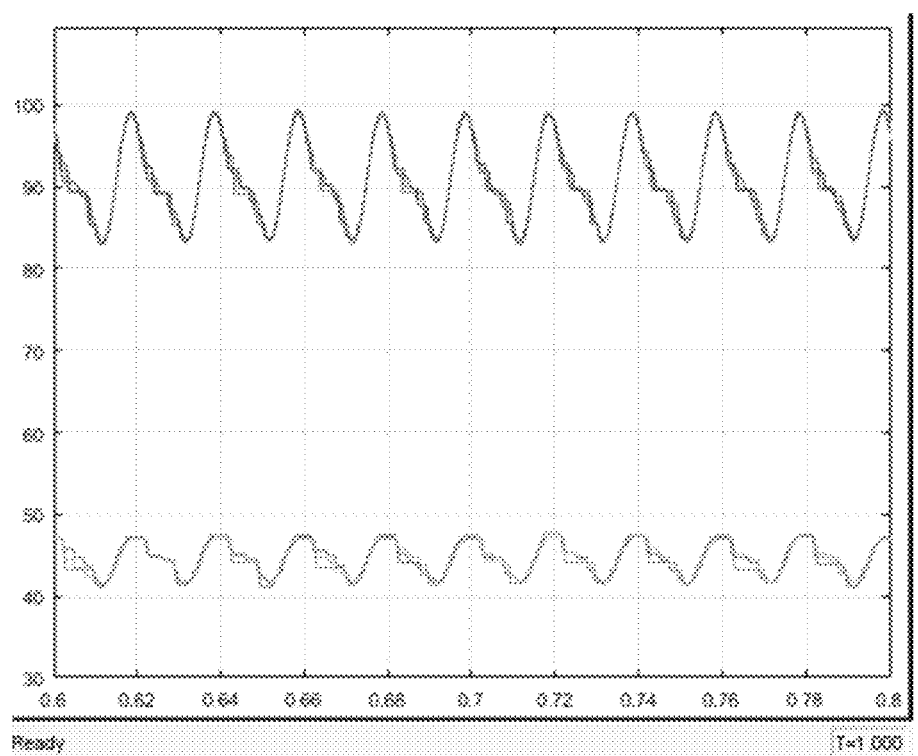
FIG. 13 is a schematic diagram of effects produced by the control method of the disclosure.

With the control method of the disclosure, control effects of the capacitor voltages in the module and the capacitor voltages among all modules are shown in FIG. 13, where simulation is performed on the basis of taking R=2 (i.e., total two modules), $U_{M1}=45V$, $U_{M2}=90V$, LCM=90V, M1=4 and M2=4 as example. Simulation waveform below represents the actual capacitor voltages $U_{M1\_x}$ of the module 1, and simulation waveform above represents the actual capacitor voltages $U_{M2\_x}$ of the module 2. According to FIG. 13, a control algorithm of the disclosure well solves the problem of balance of capacitor voltages of the sub-modules of different voltage levels in the MMC, while not adding a hardware voltage equalization circuit, and having low cost.

Exemplary embodiments of the disclosure have been shown and described above. It should be understood that the disclosure is not limited to the disclosed embodiments. Instead, the disclosure intends to cover various modifications and equivalent settings included in the spirit and scope of the appended claims.

What is claimed is:

1. A control method for a modular multilevel converter, the modular multilevel converter comprising a bridge arm circuit comprising at least one bridge arm, each bridge arm comprising a plurality of sub-modules connected in series, each of the sub-modules comprising one or more power conversion circuits connected in series, and each of the power conversion circuits comprising a capacitor, wherein the control method comprises:

detecting an actual voltage of the capacitor of each of the power conversion circuits in each of the sub-modules, and calculating an actual capacitor voltage of each of the sub-modules;

calculating a reference capacitor voltage of each of the sub-modules according to a reference voltage of the capacitor of each of the power conversion circuits in each of the sub-modules;

dividing the plurality of sub-modules in the bridge arm into a plurality of modules according to the reference capacitor voltage, wherein reference capacitor voltages of the respective sub-modules in the same module are the same, and reference capacitor voltages of the sub-modules from different modules are different;

sorting the actual capacitor voltages of the respective sub-modules in the same module to obtain a first voltage sequence;

normalizing the actual capacitor voltage of each of the sub-modules into a corresponding normalized voltage, sorting the normalized voltages of all sub-modules in the bridge arms among different modules to obtain a second voltage sequence; and determining the sub-modules to be switched on or switched off according to charging and discharging states of each sub-module, the first voltage sequence and the second voltage sequence, until an actual level of the bridge arm is consistent with a desired level, wherein the actual level of the bridge arm corresponds to a sum of the actual capacitor voltages of the plurality of sub-modules in a switch-on state within the bridge arm, and the desired level changes with a step of a first preset value.

2. The control method according to claim 1, wherein determining the sub-modules to be switched on or switched off according to the charging and discharging states of each sub-module, the first voltage sequence and the second voltage sequence comprises:

when an initial level of the bridge arm is less than the desired level, if the sub-modules are in charging state, selecting the sub-module with a minimum normalized voltage to switch on according to the second voltage sequence; if the sub-modules are in discharging state, selecting the sub-module with a maximum normalized voltage to switch on according to the second voltage sequence;

when the initial level of the bridge arm is greater than the desired level, if the sub-modules are in charging state, selecting the sub-module with a maximum normalized voltage to switch off according to the second voltage sequence; if the sub-modules are in discharging state, selecting the sub-module with a minimum normalized voltage to switch off according to the second voltage sequence.

3. The control method according to claim 2, after determining the sub-modules to be switched on, the control method further comprising:

obtaining a calculated level of the bridge arm according to the actual capacitor voltages of the sub-modules in the switch-on state;

when the calculated level is less than the desired level,
        if the sub-modules are in charging state, continuing to select the sub-module with a minimum normalized voltage to switch on according to the second voltage sequence, until the actual level of the bridge arm is greater than or equal to the desired level;
        if the sub-modules are in discharging state, continuing to select the sub-module with a maximum normalized voltage to switch on according to the second voltage sequence, until the actual level of the bridge arm is greater than or equal to the desired level;

when the calculated level is greater than the desired level,
        if the sub-modules are in charging state, selecting, according to the first voltage sequence and the second voltage sequence, at least one sub-module with high actual capacitor voltage in at least one module to switch off, or selecting at least one sub-module with low actual capacitor voltage in at least one module to switch on while selecting the sub-module with high actual capacitor voltage in at least one module to switch off;
        if the sub-modules are in discharging state, selecting, according to the first voltage sequence and the second voltage sequence, at least one sub-module with a low actual capacitor voltage in at least one module to switch off, or selecting at least one sub-module with high actual capacitor voltage in at least one module to switch on while selecting at least one sub-module with low actual capacitor voltage in at least one module to switch off;

when the actual level of the bridge arm is equal to the desired level, ending switching on and switching off of the sub-modules.

4. The control method according to claim 2, after determining the sub-modules to be switched off, the control method further comprising:

obtaining a calculated level of the bridge arm according to the actual capacitor voltages of the sub-modules in the switch-on state;

when the calculated level is greater than the desired level,
        if the sub-modules are in charging state, continuing to select the sub-module with a maximum normalized voltage to switch off according to the second voltage sequence, until the actual level of the bridge arm is less than or equal to the desired level;
        if the sub-modules are in discharging state, continuing to select the sub-module with a minimum normalized voltage to switch off according to the second voltage sequence, until the actual level of the bridge arm is less than or equal to the desired level;

when the calculated level is less than the desired level,
        if the sub-modules are in charging state, selecting, according to the first voltage sequence and the second voltage sequence, at least one sub-module with low actual capacitor voltage in at least one module to switch on, or selecting at least one sub-module with low actual capacitor voltage in at least one module to switch on while selecting at least one sub-module with high actual capacitor voltage in at least one module to switch off;
        if the sub-modules are in discharging state, selecting, according to the first voltage sequence and the second voltage sequence, at least one sub-module with high actual capacitor voltage in at least one module to switch on, or selecting at least one sub-module with high actual capacitor voltage in at least one module to switch on while selecting at least one sub-module with low actual capacitor voltage in at least one module to switch off;

when the actual level of the bridge arm is equal to the desired level, ending switching on and switching off of the sub-modules.

5. The control method according to claim 1, after determining the sub-modules to be switched on or switched off according to the charging and discharging states of each sub-module, the first voltage sequence and the second voltage sequence, further comprising:

when the normalized voltage of one of the plurality of sub-modules is greater than a voltage upper limit, or less than a voltage lower limit, replacing such sub-module by at least one sub-module selected from remaining of the plurality of sub-modules according to the charging and discharging states of the sub-module, the first voltage sequence and the second voltage sequence, such that the actual level of the bridge arm keeps constant.

6. The control method according to claim 5, wherein the step of replacing one of the plurality of sub-modules by at least one sub-module selected from remaining of the plurality of sub-modules according to the charging and discharging states of the sub-module, the first voltage sequence and the second voltage sequence when the normalized voltage of the one of the plurality of sub-modules is greater than a voltage upper limit, or less than a voltage lower limit comprises:

if the sub-modules are in charging state, when the normalized voltage of one of the plurality of sub-modules in the switch-on state is greater than the voltage upper limit, switching off such sub-module, and selecting at least one of remaining of the plurality of sub-modules to replace such sub-module according to the first voltage sequence and the second voltage sequence, such that the actual level of the bridge arm keeps constant;

if the sub-modules are in charging state, when the normalized voltage of one of the plurality of sub-modules in a switch-off state is less than the voltage lower limit, switching on such sub-module, and selecting at least one of remaining of the plurality of sub-modules to replace such sub-module according to the first voltage sequence and the second voltage sequence, such that the actual level of the bridge arm keeps constant;

if the sub-modules are in discharging state, when the normalized voltage of one of the plurality of sub-modules in the switch-on state is less than the voltage lower limit, switching off such sub-module, and selecting at least one of remaining of the plurality of sub-modules to replace such sub-module according to the first voltage sequence and the second voltage sequence, such that the actual level of the bridge arm keeps constant;

if the sub-modules are in discharging state, when the normalized voltage of one of the plurality of sub-modules in the switch-off state is greater than the voltage upper limit, switching on such sub-module, and selecting at least one of remaining of the plurality of sub-modules to replace such sub-module according to the first voltage sequence and the second voltage sequence, such that the actual level of the bridge arm keeps constant.

7. The control method according to claim 1, wherein, among different modules, a normalized coefficient is calculated according to the reference capacitor voltage of sub-module corresponding to each module, and normalized voltage of each sub-module is obtained according to the normalized coefficient and the actual capacitor voltage of the corresponding sub-module.

8. The control method according to claim 1, wherein the first preset value is an integer multiple of the least common multiple of the reference capacitor voltages of the sub-modules of the plurality of modules.

9. A control system for a modular multilevel converter, the modular multilevel converter comprising a bridge arm circuit comprising at least one bridge arm, each of the bridge arms comprising a plurality of sub-modules connected in series, each of the sub-modules comprising one or more power conversion circuits connected in series, and each of the power conversion circuits comprising a capacitor, wherein the control system comprises:

a detection and grouping unit for detecting an actual voltage of the capacitor of each of the power conversion circuits in each of the sub-modules, and calculating an actual capacitor voltage of each of the sub-modules; while calculating a reference capacitor voltage of each of the sub-modules according to a reference voltage of the capacitor of each of the power conversion circuits in each of the sub-modules; and dividing the plurality of sub-modules in the bridge arm into a plurality of modules according to the reference capacitor voltage, wherein reference capacitor voltages of the respective sub-modules in the same module are the same, and reference capacitor voltages of the sub-modules from different modules are different;

a sorting unit is configured for sorting the actual capacitor voltages of the respective sub-modules in the same module to obtain a first voltage sequence; and for normalizing the actual capacitor voltage of each of the sub-modules among different modules into a corresponding normalized voltage and sorting the normalized voltages of all sub-modules in the bridge arms to obtain a second voltage sequence; and a modulation algorithm unit for determining the sub-modules to be switched on or switched off according to charging and discharging states of each sub-module, the first voltage sequence and the second voltage sequence, until an actual level of the bridge arm is consistent with a desired level, wherein the actual level of the bridge arm corresponds to a sum of the actual capacitor voltages of the plurality of sub-modules in a switch-on state within the bridge arm, and the desired level changes with a step of a first preset value.

10. The control system according to claim 9, wherein the modulation algorithm unit is configured for:

when an initial level of the bridge arm is less than the desired level, if the sub-modules are in charging state, selecting the sub-module with a minimum normalized voltage to switch on according to the second voltage sequence; if the sub-modules are in discharging state, selecting the sub-module with a maximum normalized voltage to switch on according to the second voltage sequence;

when the initial level of the bridge arm is greater than the desired level, if the sub-modules are in charging state, selecting the sub-module with a maximum normalized voltage to switch off according to the second voltage sequence; if the sub-modules are in discharging state, selecting the sub-module with a minimum normalized voltage to switch off according to the second voltage sequence.

11. The control system according to claim 10, wherein the modulation algorithm unit is further configured for:
  after determining the sub-modules to be switched on, obtaining a calculated level of the bridge arm according to the actual capacitor voltages of the sub-modules in the switch-on state;
  when the calculated level is less than the desired level,
    if the sub-modules are in charging state, continuing to select the sub-module with a minimum normalized voltage to switch on according to the second voltage sequence, until the actual level of the bridge arm is greater than or equal to the desired level;
    if the sub-modules are in discharging state, continuing to select the sub-module with a maximum normalized voltage to switch on according to the second voltage sequence, until the actual level of the bridge arm is greater than or equal to the desired level;
  when the calculated level is greater than the desired level,
    if the sub-modules are in charging state, selecting, according to the first voltage sequence and the second voltage sequence, at least one sub-module with high actual capacitor voltage in at least one module to switch off, or selecting at least one sub-module with low actual capacitor voltage in at least one module to switch on while selecting the sub-module with high actual capacitor voltage in at least one module to switch off;
    if the sub-modules are in discharging state, selecting, according to the first voltage sequence and the second voltage sequence, at least one sub-module with low actual capacitor voltage in at least one module to switch off, or selecting at least one sub-module with high actual capacitor voltage in at least one module to switch on while selecting at least one sub-module with low actual capacitor voltage in at least one module to switch off;
  when the actual level of the bridge arm is equal to the desired level, ending switching on and switching off of the sub-modules.

12. The control system according to claim 10, wherein the modulation algorithm unit is further configured for:
  after determining the sub-modules to be switched off, obtaining a calculated level of the bridge arm according to the actual capacitor voltages of the sub-modules in the switch-on state;
  when the calculated level is greater than the desired level,
    if the sub-modules are in charging state, continuing to select the sub-module with a maximum normalized voltage to switch off according to the second voltage sequence, until the actual level of the bridge arm is less than or equal to the desired level;
    if the sub-modules are in discharging state, continuing to select the sub-module with a minimum normalized voltage to switch off according to the second voltage sequence, until the actual level of the bridge arm is less than or equal to the desired level;
  when the calculated level is less than the desired level,
    if the sub-modules are in charging state, selecting, according to the first voltage sequence and the second voltage sequence, at least one sub-module with low actual capacitor voltage in at least one module to switch on, or selecting at least one sub-module with low actual capacitor voltage in at least one module to switch on while selecting at least one sub-module with high actual capacitor voltage in at least one module to switch off;
    if the sub-modules are in discharging state, selecting, according to the first voltage sequence and the second voltage sequence, at least one sub-module with high actual capacitor voltage in at least one module to switch on, or selecting at least one sub-module with high actual capacitor voltage in at least one module to switch on while selecting at least one sub-module with low actual capacitor voltage in at least one module to switch off;
  when the actual level of the bridge arm is equal to the desired level, ending switching on and switching off of the sub-modules.

13. The control system according to claim 9, wherein the control system further comprises:
  a replacement unit configured for, when the normalized voltage of one of the plurality of sub-modules is greater than a voltage upper limit, or less than a voltage lower limit, replacing such sub-module by at least one sub-module selected from remaining of the plurality of sub-modules according to the charging and discharging states of the sub-module, the first voltage sequence and the second voltage sequence, such that the actual level of the bridge arm keeps constant.

14. The control system according to claim 13, wherein the replacement unit is configured for:
  if the sub-modules are in charging state, when the normalized voltage of one of the plurality of sub-modules in the switch-on state is greater than the voltage upper limit, switching off such sub-module, and selecting at least one of remaining of the plurality of sub-modules to replace such sub-module according to the first voltage sequence and the second voltage sequence, such that the actual level of the bridge arm keeps constant;
  if the sub-modules are in charging state, when the normalized voltage of one of the plurality of sub-modules in a switch-off state is less than the voltage lower limit, switching on such sub-module, and selecting at least one of remaining of the plurality of sub-modules to replace such sub-module according to the first voltage sequence and the second voltage sequence, such that the actual level of the bridge arm keeps constant;
  if the sub-modules are in discharging state, when the normalized voltage of one of the plurality of sub-modules in the switch-on state is less than the voltage lower limit, switching off such sub-module, and selecting at least one of remaining of the plurality of sub-modules to replace such sub-module according to the first voltage sequence and the second voltage sequence, such that the actual level of the bridge arm keeps constant;
  if the sub-modules are in discharging state, when the normalized voltage of one of the plurality of sub-modules in the switch-off state is greater than the voltage upper limit, switching on such sub-module, and selecting at least one of the remaining of the sub-modules to replace such sub-module according to the first voltage sequence and the second voltage sequence, such that the actual level of the bridge arm keeps constant.

15. The control system according to claim 9, wherein the sorting unit is further configured for calculating a normalized coefficient according to the reference capacitor voltage of sub-module corresponding to each module, and normalizing the actual capacitor voltage of each of the sub-modules into the corresponding normalized voltage according to the normalized coefficient.

16. The control system according to claim 9, wherein the first preset value is an integer multiple of the least common multiple of the reference capacitor voltages of the sub-modules of the plurality of modules.

17. The control system according to claim 9, wherein, in the modular multilevel converter, an output end of each of the power conversion circuits is parallelly connected with a bypass switch, when the bypass switch is on, the corresponding power conversion circuit is in a bypass mode, when the bypass switch is off, the corresponding power conversion circuit is in a connection mode, and the reference capacitor voltage of the sub-module is equal to a sum of the reference voltages of the capacitors of the power conversion circuits in the connection mode.

18. The control system according to claim 9, wherein, in the same sub-module, a same driving signal is used for all power conversion circuits in the connection mode.

19. A power transmission system, comprising:
- a modular multilevel converter comprising a bridge arm circuit comprising at least one bridge arm, each of the bridge arms comprising a plurality of sub-modules connected in series, each of the sub-modules comprising one or more power conversion circuits connected in series, and each of the power conversion circuits comprising a capacitor; and
- the control system according to claim 9.

20. The power transmission system according to claim 19, wherein the first preset value is an integer multiple of the least common multiple of the reference capacitor voltages of the sub-modules of the plurality of modules.

\* \* \* \* \*